US008112755B2

(12) United States Patent
Apacible et al.

(10) Patent No.: US 8,112,755 B2
(45) Date of Patent: Feb. 7, 2012

(54) REDUCING LATENCIES IN COMPUTING SYSTEMS USING PROBABILISTIC AND/OR DECISION-THEORETIC REASONING UNDER SCARCE MEMORY RESOURCES

(75) Inventors: Johnson T. Apacible, Mercer Island, WA (US); Eric J. Horvitz, Kirkland, WA (US); Mehmet Iyigun, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1286 days.

(21) Appl. No.: 11/428,231

(22) Filed: Jun. 30, 2006

(65) Prior Publication Data

US 2008/0005736 A1   Jan. 3, 2008

(51) Int. Cl.
G06F 9/46 (2006.01)
(52) U.S. Cl. ....................................................... 718/104
(58) Field of Classification Search .................. 718/100, 718/104
See application file for complete search history.

(56) References Cited

U.S. PATENT DOCUMENTS

| | | | |
|---|---|---|---|
| 5,134,563 A | | 7/1992 | Tayler et al. |
| 5,349,682 A | * | 9/1994 | Rosenberry .................. 718/102 |
| 5,442,730 A | * | 8/1995 | Bigus .............................. 706/19 |
| 5,465,358 A | * | 11/1995 | Blades et al. ................. 715/707 |
| 5,493,692 A | | 2/1996 | Theimer et al. |
| 5,544,321 A | | 8/1996 | Theimer et al. |
| 5,555,376 A | | 9/1996 | Theimer et al. |
| 5,603,054 A | | 2/1997 | Theimer et al. |
| 5,611,050 A | | 3/1997 | Theimer et al. |
| 5,752,255 A | | 5/1998 | Jarvis |
| 5,812,865 A | | 9/1998 | Theimer et al. |
| 6,016,503 A | * | 1/2000 | Overby et al. ................ 718/104 |
| 6,466,232 B1 | | 10/2002 | Newell et al. |
| 6,513,046 B1 | | 1/2003 | Abbott, III et al. |
| 6,549,915 B2 | | 4/2003 | Abbott, III et al. |
| 6,571,259 B1 | | 5/2003 | Zheng et al. |
| 6,647,508 B2 | | 11/2003 | Zalewski et al. |
| 6,747,675 B1 | | 6/2004 | Abbott et al. |
| 6,791,580 B1 | | 9/2004 | Abbott et al. |
| 6,801,223 B1 | | 10/2004 | Abbott et al. |
| 6,812,937 B1 | | 11/2004 | Abbott et al. |

(Continued)

FOREIGN PATENT DOCUMENTS

WO    9800787    1/1998

OTHER PUBLICATIONS

James Oly, Daniel A. Reed; Markov Model Prediction of I/O Requests for Scientific Applications; 2002, ACM; International Conference on Supercomputing; Proceedings of the 16th international conference on Supercomputing; pp. 147-155.*

(Continued)

*Primary Examiner* — Meng An
*Assistant Examiner* — Blake Kumabe
(74) *Attorney, Agent, or Firm* — Lee & Hayes, PLLC

(57) ABSTRACT

Architecture that employs probabilistic and/or decision-theoretic model(s) of application usage to predict application use and in view of bounded or limited-availability memory. The model(s) is applied with cost-benefit analysis to guide memory management in an operating system, in particular, for both decisions about prefetching and memory retention versus deletion or "paging out" of memory of lower priority items, to free up space for higher value items. Contextual information is employed in addition to computer action monitoring for predicting next applications to be launched. Prefetching is optimized so as to minimize user perceived latencies.

19 Claims, 20 Drawing Sheets

U.S. PATENT DOCUMENTS

| | | | |
|---|---|---|---|
| 6,842,877 | B2 | 1/2005 | Robarts et al. |
| 6,891,543 | B2 | 5/2005 | Wyatt |
| 7,043,506 | B1 * | 5/2006 | Horvitz .................. 707/661 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046135 | A1 * | 3/2003 | Cartwright et al. ............... 705/8 |
| 2003/0046401 | A1 | 3/2003 | Abbott et al. |
| 2003/0084433 | A1 * | 5/2003 | Luk et al. ...................... 717/158 |
| 2003/0154476 | A1 | 8/2003 | Abbott, III et al. |
| 2004/0034739 | A1 | 2/2004 | Ramagopal et al. |
| 2004/0083452 | A1 * | 4/2004 | Minor et al. .................. 717/109 |
| 2004/0128328 | A1 | 7/2004 | Leff et al. |
| 2004/0168027 | A1 | 8/2004 | Hu et al. |
| 2004/0215746 | A1 * | 10/2004 | McCanne et al. ............. 709/219 |
| 2005/0034078 | A1 | 2/2005 | Abbott et al. |
| 2005/0034124 | A1 * | 2/2005 | House et al. .................. 718/100 |
| 2005/0120133 | A1 | 6/2005 | Slack-Smith |
| 2005/0144337 | A1 * | 6/2005 | Kahle ............................. 710/22 |
| 2005/0172082 | A1 | 8/2005 | Liu et al. |
| 2006/0069821 | A1 * | 3/2006 | P et al. ............................ 710/52 |
| 2006/0155733 | A1 * | 7/2006 | John et al. ..................... 707/101 |

OTHER PUBLICATIONS

Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilit, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, in Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 4 pages.
Bill Schilit, et al., Context-Aware Computing Applications, in Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In the 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of the First International Conference on the Practical Application of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: a System for Augmented Theory, The Proceedings of the First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May, 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
Robert M. Losee, Jr., Minimizing information overload: the ranking of electronic messages, Journal of Information Science 15, Elsevier Science Publishers B.V., 1989, pp. 179-189.
Shaoyu Zhou, et al., Cache Modelling in a Performance Evaluator of Parallel Database Systems, MASCOTS '97, Jul. 12, 1996, 17 pages.
E. Brewer, High-Level Optimization via Automated Statistical Modeling, Proceedings of the 5th ACM SIGPLAN Symposium on Principles and Practice of Parallel Programming (PPOPP), Santa Barbara, CA, 1995, pp. 80-91.
D.B. Noonburg, A Framework for Statistical Modeling of Superscalar Processor Performance, PhD Dissertation, Carnegie Mellon University, Dept. of Electrical and Computer Engineering, Sep. 1997, 165 pages.

* cited by examiner

REDUCING LATENCIES IN COMPUTING SYSTEMS USING PROBABILISTIC AND/OR DECISION-THEORETIC REASONING UNDER SCARCE MEMORY RESOURCES

BACKGROUND

Today, more than ever, computer systems have been playing an increasingly important role in the lives of people and businesses. In a micro sense, decisions by machine processes can impact the way a system reacts and/or a human interacts with computer output.

People have come to expect that they can use computing systems to perform multiple tasks. They are relying on computing systems to support multiple applications, communications, and more generally, multiple goals of computer users. At the same time, users expect computers to respond to commands and application launches without significant latency.

There are limitations in the quantity of computational memory available at different levels of memory in a hierarchy of storage, and the memory at different levels has different latencies for access of program information and data. Differing amounts of required memory storage lead to different latencies in real time when an application or feature is accessed. In particular, this problem impacts users of portable devices (portable computers, cell phones, PDAs, . . . ), where typically, physical space for memory can be limited and sufficient memory capacity for system processing is usually much more expensive in terms of cost.

Interest has been growing in opportunities that attempt to solve, or at least reduce, latencies associated with application and data processing by including intelligent memory management for memory systems that employ statistical modeling methods which make predictions about system and user actions so as to provide guidance in decisions about managing the scarce memory resources. A goal with such intelligent memory management is to reduce latencies in the system by reducing the likelihood that the slowest memory, for example, a rotating disk media, will have to be accessed in real time to support a user command.

Machine learning and reasoning can facilitate the statistical characterization of next actions of the user and/or the system. Unfortunately, general machine learning and reasoning systems can require memory and storage that exceeds the memory and storage available in an operating system environment. Additionally, such systems may impose new latencies on operations, and thus, may result in increasing latencies, even if recommendations for memory management are overall good decisions.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture manages the use of probabilistic and/or decision-theoretic methods that are used to perform learning and reasoning models under limited memory, observational, and runtime resources.

In the general case, an attempt to minimize latencies by selecting the next applications to prefetch is an intractable optimization, considering the likelihoods of the possible next components to be used, and their sizes (and thus, the amount of expected savings in waiting to have this page in from disk). However, approximations can be employed. For example, given a set of predictions from a bounded-resource probabilistic model, a value-density approximation to a knapsack problem solution can be employed to prioritize components for prefetching and/or retaining in fast memory. (The knapsack problem is a type of integer program with just one constraint—each item that can be selected to go into a knapsack (e.g. a quantity of available memory) having a certain capacity, has a size and a benefit. Given that the knapsack has a certain capacity, the problem becomes a matter of selecting item(s) for insertion into the knapsack so as to maximize the total benefit.)

In another innovative aspect, more than one predictive method can be employed, and the outputs of different methods can be combined via model mixture methodologies to enhance the accuracy of predictions. Such methods can be used, for example, to mix together background statistics on application usage, for example, partitioned by time of day and week, with inferential Markov models operating under bounded memory resources, with mixture parameters that are tuned to optimize predictive performance.

In support thereof, disclosed and claimed herein, in one aspect thereof, is a computer-implemented system that facilitates the management of system resources. The system comprises a bounded memory resource for utilization by system processes, and a management component that manages utilization of a learning and reasoning model based on the bounded memory resource to reduce latency in the system processes.

Other innovative aspects include the following: use of probabilistic and/or decision-theoretic (cost-benefit under uncertainty) models to guide memory management in an operating system, in particular, for both decisions about prefetching and memory retention versus deletion or "paging out" of memory of lower priority items, to free up space for higher value items; use of contextual information in addition to computer action monitoring for predicting next applications to be launched; and, the consideration, beyond just likelihood, of a cost-benefit analysis in prefetching decisions—in essence, of optimizing prefetching so as to minimize user perceived latencies.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
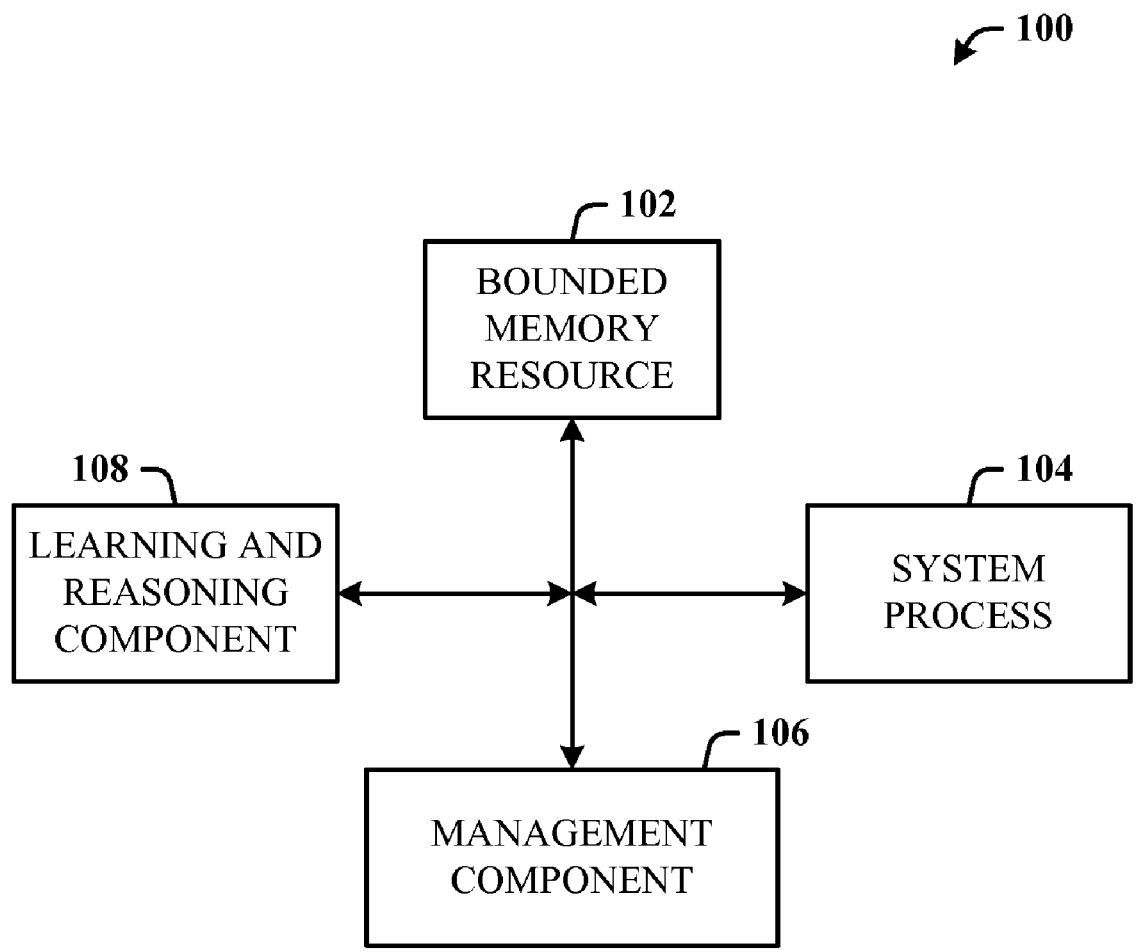
FIG. 1 illustrates a computer-implemented system that facilitates the management of system resources in accordance with the innovative architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed architecture manages the use of one or more probabilistic and/or decision-theoretic methods, within a learning and reasoning methodology, within a system that includes scarce or limited memory (e.g., system memory, cache memory, mass storage), observational, and runtime resources. Moreover, a mixed model methodology can be applied such that more than one predictive method is employed, the outputs of which can be combined to enhance the accuracy of predictions. Such methods can be used, for example, to mix together background statistics, such as a probability distribution over sets of applications that are used at different times of day and days of week, and Markov inferential models under bounded resources, with mixture parameters that are tuned to optimize predictive performance. Additional novel aspects are described infra.

Referring initially to the drawings, FIG. 1 illustrates a computer-implemented system 100 that facilitates the management of system resources. The system 100 includes a bounded memory resource 102 for utilization by a system process 104 (e.g., an application, data), and a management component 106 that manages the utilization of a machine learning and reasoning component 108 based in part on the bounded memory resource 102 to reduce latency associated with the system process 104.

Machine learning and reasoning can facilitate the statistical characterization of a user's or system's next actions, based on the collection and analysis of a database of past behavior, extrapolation or interpolation of data based on some best-fit, error estimates of observations, and/or spectral analysis of data or model generated output, for example. Beyond predictions, decisions about which components should be prefetched, which components should remain in memory, and which components should be "paged out" of memory, so as to free space for other program data to be stored, can be based on a cost-benefit analysis, and more generally, under uncertainty, a decision-theoretic analysis that considers preferences and expected latencies.

Such an analysis considers not only likelihoods that program data will be required to satisfy a user's needs and actions, in working with a computing system, but also the memory required to store in memory the different components of program data associated with the different future needs. Differing amounts of required memory storage lead to different latencies in real time when an application or feature is accessed. Thus, prefetching decisions should consider different latency reductions associated with the prefetching of the components associated with future user needs. In one approach, the ideal allocation of memory can be considered as the solution to a decision-theoretic knapsack analysis and employ a value-density approximation to prioritizing components for prefetching or keeping in memory, versus paging out of data.

A goal in building such predictive models is to support smart decisions about the transfer of program data into scarce, but fast, memory locations via prefetching operations, and the clearing of memory of program data, so as to free up space for other components.

The bounded memory resource 102 can include many different types of memory, for example, L1 cache memory, L2 cache memory, L3 cache memory, etc.; essentially, any of Lx type of cache memory, where x is an integer. Accordingly, statistical models based in part on application usage can be generated that take into consideration the type, size, and/or speed of memory under utilization management. For example, if it is computed and modeled according to one statistical model that the next application (or program or code) expected (according to prediction) to be executed typically utilizes a faster memory (e.g. L1 cache over L2 cache), then the system 100 can manage this attribute to use the faster cache memory.

In another example, if it is computed and modeled according to one statistical model that the next application (or program or code) expected to be executed is not a high priority application in terms of prioritization criterion, then the system 100 can manage this consideration to use the slower cache memory.

In yet another implementation, the system 100 can enqueue data that allows the expected application to be moved to a faster cache memory when space becomes available in the faster memory. For example, if all or part of the faster memory is allocated or in a prefetch operation, which can be indicators that the memory is under management for another application, the expected application has to wait, or is processed in a slower cache memory.

The machine learning and reasoning component 108 facilitates automating one or more features in accordance with the subject innovation. In this particular implementation, the component 108 is positioned to interface to each of the bounded memory resource 102, the management component 106, and the system process.

The subject invention (e.g., in connection with selection) can employ various learning and reasoning-based schemes for carrying out various aspects thereof. For example, a process for learning and reasoning about predicting when an application will be launched can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the subject invention can employ classifiers that are explicitly trained (e.g. via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one example, the component 108 learns and reasons about activities of the system process 104 and other system processes in order to effect more efficient management (by the management component 106) of the bounded memory 102. The system process 104 can be related any program or application launch, foreground and background activities, program and application data activities, and user and/to system interactions with the system process 104, whether direct or indirect. Additional implementations of the learning and reasoning component 108 are described infra.

Figure 2:
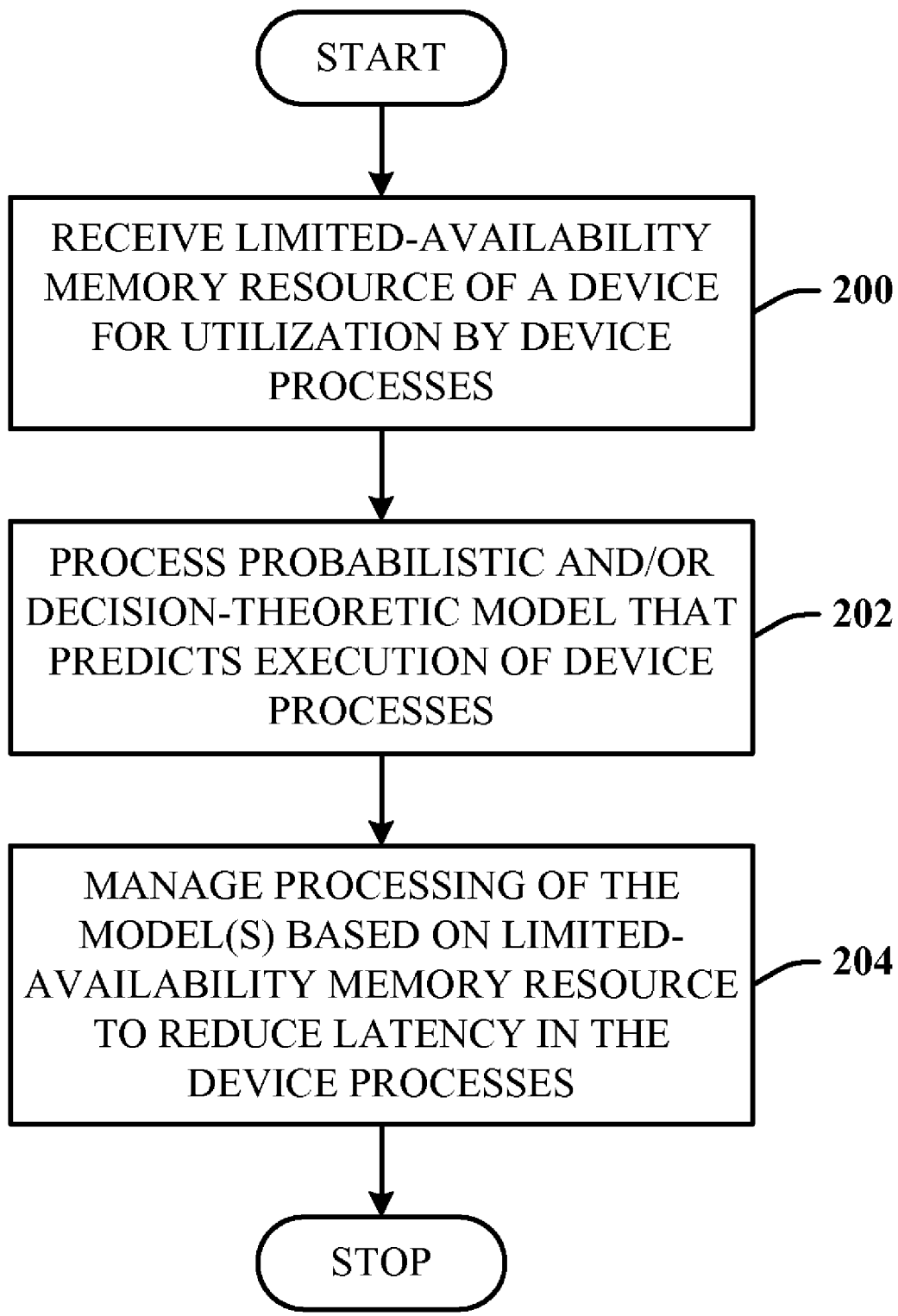
FIG. 2 illustrates a methodology of managing system resources in accordance with an aspect.

FIG. 2 illustrates a methodology of managing system resources in accordance with an aspect. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a limited-availability (or bounded) memory resource of a device is received for utilization by one or more device processes (e.g. programs and program data). At 202, a probabilistic and/or decision-theoretic model is processed that predicts execution of the device processes. At 204, processing of the model(s) is based on the limited-availability memory resource to reduce latency in the device processes.

Figure 3:
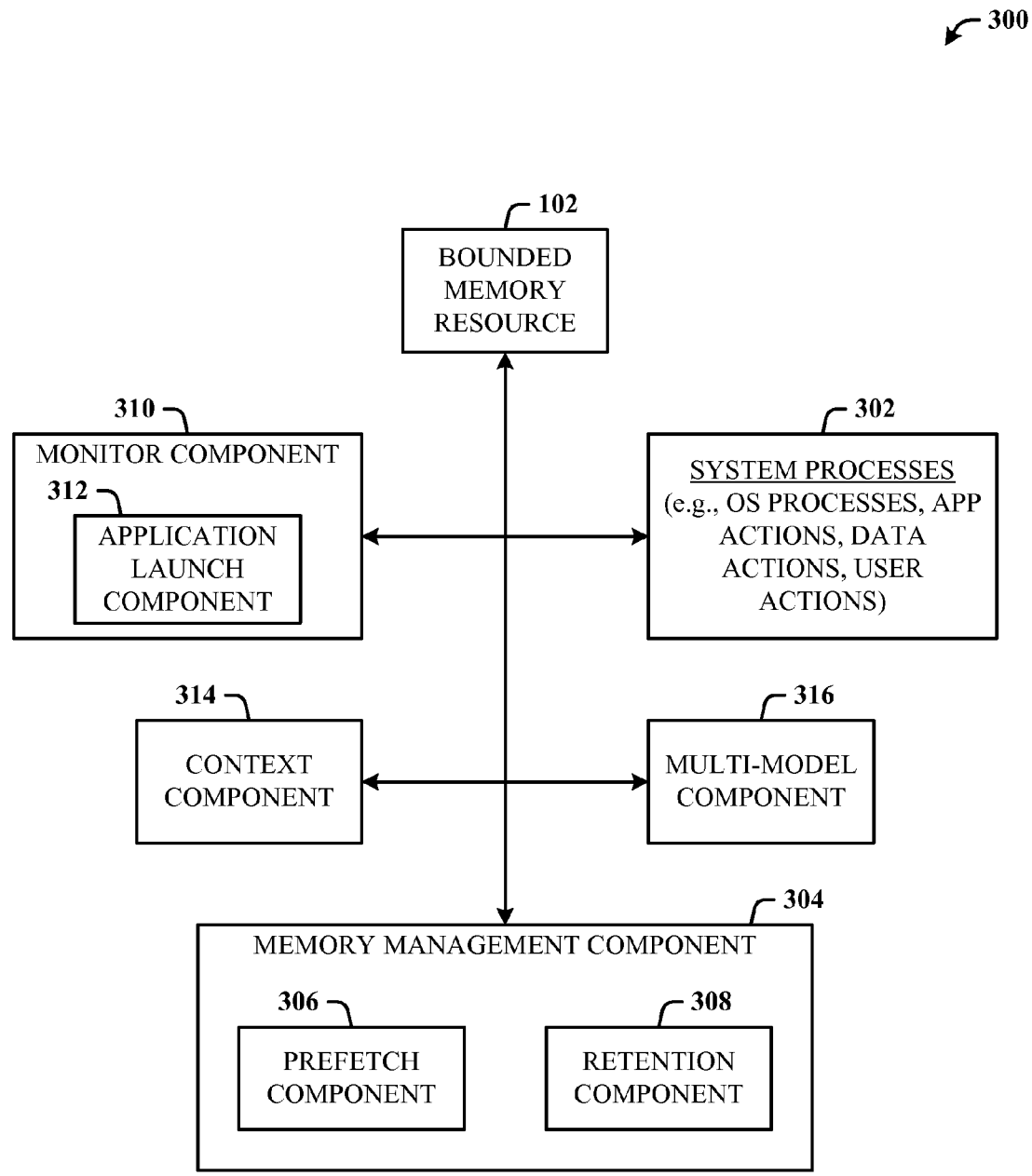
FIG. 3 illustrates a block diagram of an alternative system that facilitates the management of system resources in accordance with another aspect.

FIG. 3 illustrates a block diagram of an alternative system 300 that facilitates the management of system resources in accordance with another aspect. The system 300 includes the bounded memory resource 102 for utilization by system processes 302 that can include operating system (OS) processes, program actions, data actions, and data associated with user actions, for example.

The system 300 includes a memory management component 304 for managing one or more memory operations. For example, a prefetch component 306 facilitates prefetching of data and/or programs into the bounded memory 102. Additionally, a retention component 308 of the memory management component 304 facilitates data retention control in the bounded memory 102.

A monitor component 310 facilitates the monitoring of application actions and associated states, for example, if the program is in a foreground state or a background state. An application launch component 312 of the monitor component 312 supports the computation of probability data associated with launch of a next application. The application launch component 312 can be configured to not only focus on a foreground application, but also background application processes. Additionally, the launch component 312 can be configured with more flexibility to give more general preference to, for example, applications the user spends more time on, and so on. Still further, a classification mechanism can be employed to separate applications the user "cares" about from the applications the user does not care about (e.g., virus checkers, cookie checkers, spyware checking, and other processes that could launch, and in particular, launch in the foreground). Accordingly, modeling can include filtering out the applications the user does not care about (related at least to usage monitoring and latency effects) and only consider applications that are important to the user, and with respect to latency considerations (e.g. applications the use cares about that are disk-bound, that can lead to delays). Moreover, the launch component 312 can be limited to achieve better prediction accuracy and avoid wasting the limited memory resources by prefetching applications that are not critical for user-perceived responsiveness. The notion of caring can be determined by historical data based on how often the user has launched the application in the past, how much data has been generated by an application, and so on.

One kind of a probabilistic model that can be used to infer the probability of the next application launch, based on a sequence of observed applications, is a Markov model. Such a model can look back n-steps associated with the system processes, where n is an number that can be varied depending on the available memory. The system continues to look at the top n of all applications being used by a user, and in combination with contextual information such as time of day and day of week, for example, builds Markov models that are focused on explicitly reasoning about the top n applications, and then using both the n applications and an "other application" token for examining sequences and for predicting the next applications. In other words, under bounded resources, the methods consider that they just saw, App1, App3, App4, O (for "other", meaning, not modeled explicitly), and App5, and the methods predict that the likelihood of the next application, in order of probability is, App5, App8, O, App7, and so on. This is one way of dealing with the bounded resources issues.

The system 300 can also include a context component 314 such that machine learning and reasoning methods for supporting memory management can consider not just a set of actions or situations (e.g. data and program actions) sensed via a computing system, but can also consider other sources of contextual evidence, such as time of day, day of week, the identity of the current user or users working with a computing system, information about appointments stored on a calendar, and so on.

A multi-model component 316 facilitates the use of many different models in support of managing the bounded memory resource. One implementation employs a "model mixture" method, where a Markov model can be combined with a model that captures background statistics. This is described in greater detailed with respect to FIG. 15.

The system 300 facilitates other innovative aspects, including the use of probabilistic and/or decision-theoretic (cost-benefit under uncertainty) models to guide memory management of the bounded memory 102 by the management component 304, in particular, for both decisions about prefetching and memory retention versus deletion (or "paging out") of lower priority items, to free up space for higher valued items. Additionally, prefetching can be optimized by considering, beyond just a likelihood, a cost-benefit analysis of prefetching decisions to minimize user perceived latencies.

In the general case, considering the likelihoods of the possible next components to be used and their sizes (and thus, the amount of expected savings in waiting to have this page in from disk) is an intractable optimization. Given a set of predictions, a value-density approximation to a knapsack problem solution can be employed for minimizing the latencies. (The knapsack problem is a type of integer program with just one constraint—each item that can be selected to go into a knapsack having a certain capacity, has a size and a benefit. Given that the knapsack has a certain capacity, the problem becomes a matter of selecting item(s) for insertion into the knapsack so as to maximize the total benefit.)

Following is one detailed exemplary implementation of the application launch component 312. The application launch component 312 can be employed to collect data on a machine's foreground application launch behavior. By using the launch record of foreground application launches in the machine, the component 312 can construct a probabilistic model (e.g., Markov) of the application launch activity. This allows the system to predict with a high probability on which foreground application will be launched next.

The launch component 312 gets callback notifications from the system. Initialize and start routines can be called during initialization and a cleanup routine can be called at shutdown. At runtime, the launch component 312 calls a log entry routine to inform the launch component of application launch events. The launch component 312 is provided with the full path to the application and a hash of this path. The launch component looks up the path hash in a table to distinguish between foreground and background applications and, stores and uses the integer hash to create a transition table. In one implementation, the launch record and the transition table can be dynamically configurable based on a feedback mechanism that takes into account the accuracy of the predictions and the frequency of launch records being generated.

The launch component 312 can implement aging by using a circular array, for example. Older records are thus overwritten by newer ones and will not be used in the next transition table generation.

Given launch records by the prefetch system, the launch component 312 can perform the following: store launch records; generate a transition model based on the launch records; and update a transition model based on new data (aging). Note that the current context of the launch component 312 can be stored using a singleton object.

As previously indicated, a circular array can store launch records, and launch records can come in the form of a hash of the application name. The count of launch entries added to the array since the last time a transition model was generated can also be recorded. This count can be used to trigger new model generation. A value of the number of launch records in the array can also be stored, and in one implementation, is not to exceed an application launch history count.

If the array is circular, an index can be provided referencing where the next launch record is stored. The value of index can range from zero to the launch history count. A circular array can be provided that contains the last two (or n) application launches. This array can be used to compute a hash into the transition table during predictions. An index can also be provided for where the next last-application record will be stored. A hash table is provided for containing the current top applications being considered, which is used to determine if a launch record needs to be considered for the transition table generation.

Launch records are stored in the history circular array stored in a launch component context. Launch records are stored as they come in, and launch records for foreground applications are stored. When the number of new launch records since the last transition table creation reaches a certain threshold represented by the constant, the transition table is regenerated. This ensures proper aging. There is, however, an exception to this threshold during startup time, since the launch component does not have an existing model when the launch component 312 is first run on the system; it uses a smaller threshold to trigger the creation of the first model. At periodic intervals, the launch records can be persisted onto disk.

Using the launch records, the launch component 312 determines the top applications. These are the applications that are considered when constructing the transition table. This limit provides an upper bound on the size of the transition table. The launch component 312 puts the current set of top applications on the hash table stored in a launch component context object.

The launch component 312 can make a second pass through the launch records and use the last n (where n is equal to a cluster size) application hashes to simulate an $n^{th}$ order Markov model. The launch component 312 can logically OR these hashes and use that as a key to the hash table. Pauses can also be considered as launches. These events can be marked with a special symbol in the table (e.g. "L") and are used to generate additional combinations for the Markov table.

To enhance the accuracy and reduce the volatility of the predictions, the launch history and a transition table can be maintained per time-of-day period where the time-of-day periods can be arranged hierarchically. For example, in a two-level hierarchy, one can maintain 6-hour time periods for weekdays and a "parent" time period for all five weekdays. The same can be done for weekends as well. When making predictions, the current and the parent time periods' top n launch predictions can be combined, probabilistically favoring the most specific time period.

The value is an application cluster object that contains the list of observed transitions implemented using a single linked list hanging off of the cell head member.

The next application launch routine shows how the most likely next applications are computed. The routine accepts a threshold so only predictions that are at least this value are included. The routine can look at the last two (or whatever the value of the cluster size) applications launched, gets the OR'd value of the two hashes, and uses this as the key to the transition table. The value returned by this hash table can be a pointer to an application cluster object. As described previously, this object represents the row of the transition table that corresponds to the combined hash. The object has a single linked list of transitions to a particular application with the number of transitions (hits) to this particular application. Dividing this number by the cluster hit count generates the probability that the next application is this application.

The launch component 312 walks this singly linked list and picks out the top applications that have probabilities that are at least equal to the user provided threshold.

With respect to persisting data, at the start of every hour, for example, the launch component 312 writes the current launch records to disk. In this example, this ensures that the launch records will be current up to one hour in case of unexpected shutdowns. The launch component 312 can also write out the current indices and counts related to the table. On startup, the data is loaded and new records appended to the loaded records using the counts and indices that were stored with the launch records.

Figure 4:
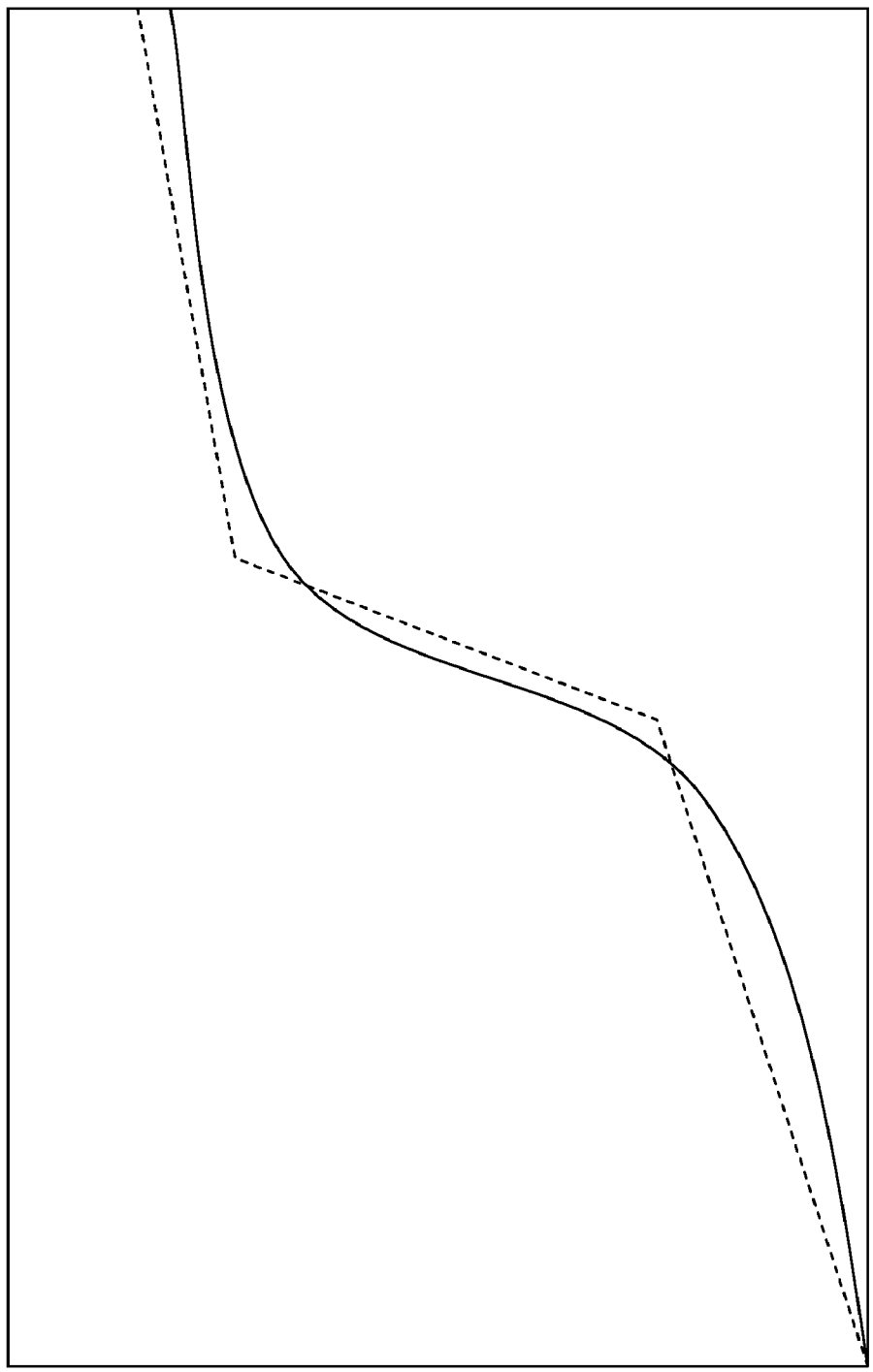
FIG. 4 illustrates an exemplary representation of application-prefetching associated with cost-benefit analysis.

FIG. 4 illustrates an exemplary representation of application-prefetching associated with cost-benefit analysis. The core notion is not to only consider the likelihood of the next application to be fetched, but also its size on disk, and thus, the amount of time that would be needed to "page it in" when a user asks for that application and required related data resources.

User frustration is not likely to be linear with the wait, but is more likely to be non-linear. The representation is a sample qualitative curve, both a smooth curve that could be assessed from users in a latency study, but also the piecewise linear representation. The idea is that the savings in latency (and thus, the expected savings for each component prefetched) is computed by looking at the size of each application and determining how much frustration would be saved with each application. This is "expected savings" if considering the likelihood of the application being used.

Figure 5:
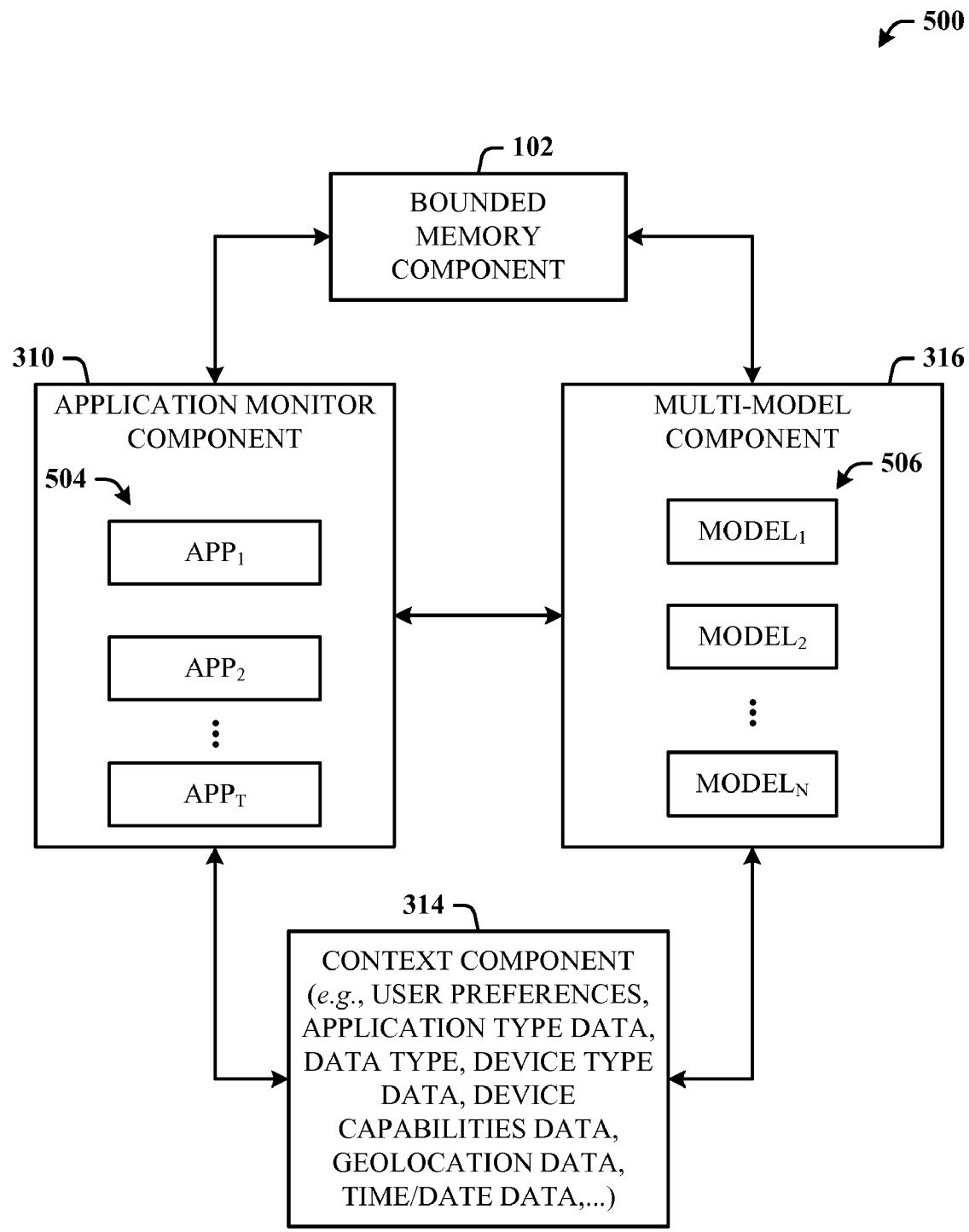
FIG. 5 illustrates a more detailed block diagram of a system that facilitates the management of bounded memory resources.

FIG. 5 illustrates a more detailed block diagram of a system 500 that facilitates the management of bounded memory resources. The system 500 includes the bounded memory component 102 and, the context component 314, application monitor component 310 and multi-model component 316, described respectively with respect to FIG. 1 and FIG. 3. The application monitor component 310 monitors one or more applications 504 (denoted $APP_1, APP_2, \ldots, APPT$, where T is an integer) and for which the model component 316 generates one or more models 506 (denoted $MODEL_1, MODEL_2, \ldots, MODEL_N$, where N is an integer). The context component 314 analyzes, determines, and receives context information (e.g., user preferences, application type data, data type, device type data, device capabilities data, geolocation data, time/date data, . . . ) which can be used to further develop the models 506.

For example, a first statistical model ($MODEL_1$) can be generated based on the order in which the first two applications ($APP^1$ and $APP_2$) are used by the user. Accordingly, cache memory of the memory component 102 can be controlled such that prefetching and/or allocation will be according to the order of execution.

In another example, where $APP_1$ is larger than $APP_2$, the model ($MODEL_2$) can be generated that manages memory of the memory component 102 such that the smaller app ($APP_2$) can be given priority in execution over $APP_1$ based on available cache memory. In yet another example, based on context data of the context component 314, the user routinely uses the same application $APP_2$ on a given device at an approximate time. Thus, the system 500 can predict and then expect that $APP_2$ will be used again, as developed into ($MODEL_2$), and the prefetching and/or allocation processes can be performed in preparation for $APP_2$ to be executed again at this time. Theses are only a few of the examples in which the system 500 can be employed to optimize memory and application usage in a bounded memory situation.

Figure 6:
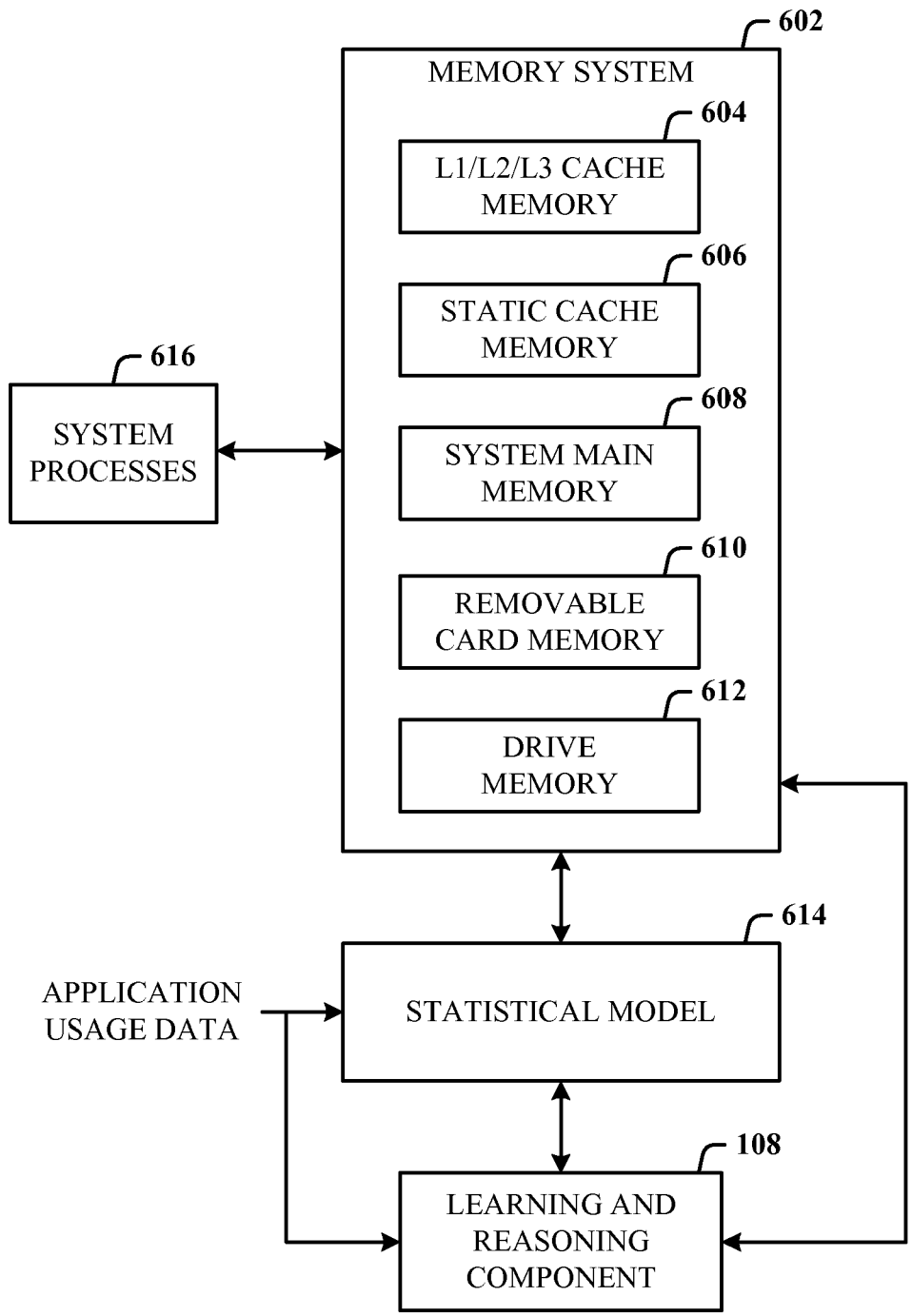
FIG. 6 illustrates a system having a memory system that can include many different types of memory that benefit from the application usage optimization architecture of the subject innovation.

FIG. 6 illustrates a system 600 having a memory system 602 that can include many different types of memory (bounded, and relatively speaking, "unbounded") that benefit from the application usage optimization architecture of the subject innovation. The memory system 602 can include one or more bounded memories such as of L1, L2, and L3 cache memory 604 (e.g. any Lx cache memory, where x is an integer), static RAM cache memory 606, system main memory 608, removable card memory 610 (e.g., flash memory), and mass storage subsystems 612 (e.g., hard drive, optical drive, RAM drive . . . ). A statistical model 614 receives as input application usage data associated with one or more system processes 616 that utilize the memory system 602, and operates accordingly to facilitate system management related application usage given bounded memory conditions for any of the memory of the memory system 602. The learning and reasoning component 108 can interface to receive the application usage data and, to both the statistical model 614 and the memory system 602 to learn and reason about their processes, and to facilitate automation of one or more functions or processes thereof.

Figure 7:
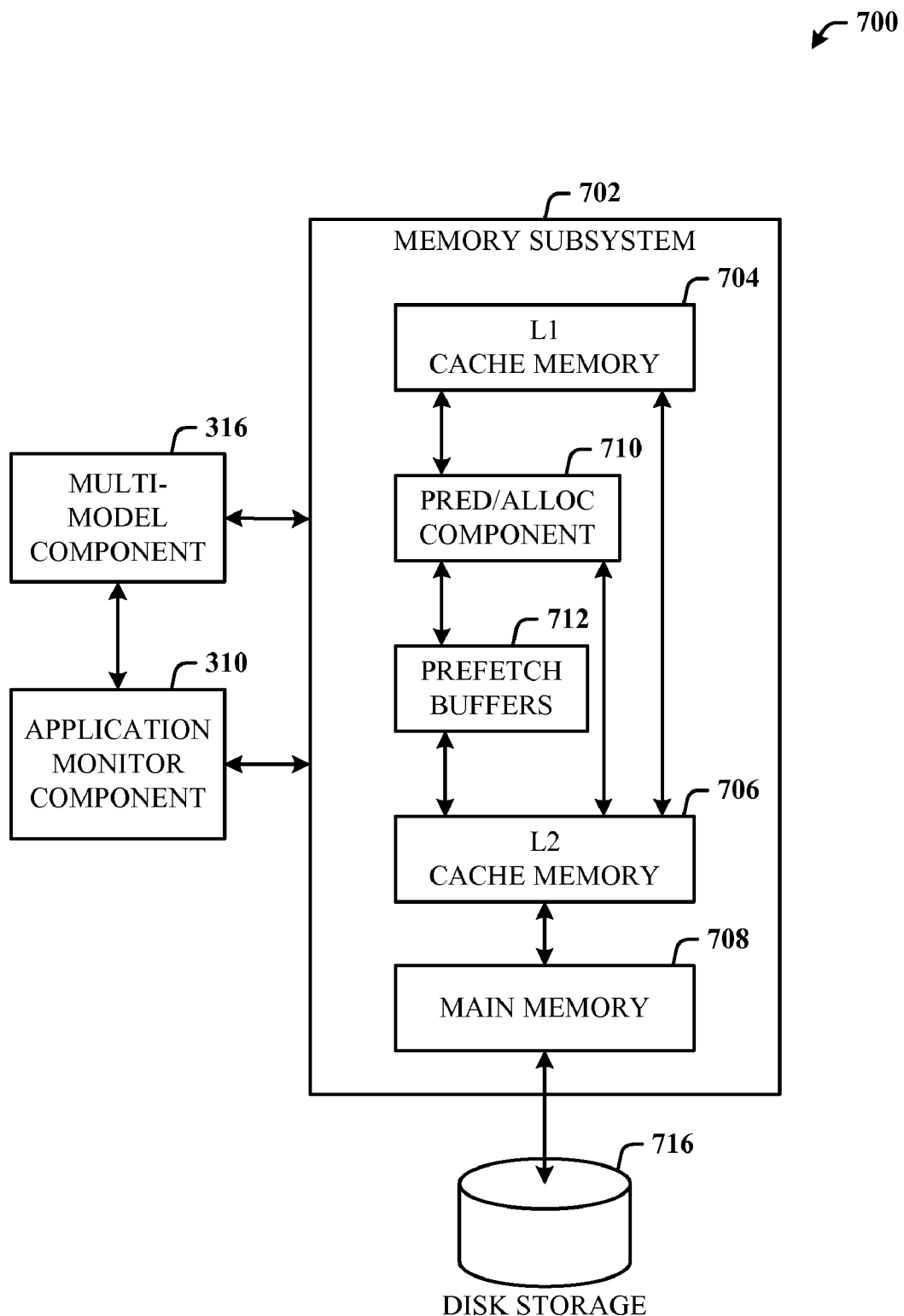
FIG. 7 illustrates a system having one version of a memory subsystem 702 that utilizes prefetching and caching based on application usage and bounded memory conditions in accordance with another aspect.

FIG. 7 illustrates a system 700 having one version of a memory subsystem 702 that utilizes prefetching and caching based on application usage and bounded memory conditions in accordance with another aspect. The subsystem 702 includes an L1 cache memory 704, and an L2 cache memory 706 that connects to a main memory 708. The subsystem 702 also includes a prediction/allocation component 710 that interfaces to a prefetch buffer 712 for fetching application information in preparation for caching in the L2 cache 706. The prediction/allocation component 710 facilitates at least one of a prediction function for predicting what application(s) will be passed to the L2 cache memory 706 and an allocation function for allocating memory in the L2 cache memory 706. The multi-model component 316 interfaces to the memory subsystem to effect at least the prefetching and prediction/allocation component based on a single model or for a mixed model implementation, as activated by the user (or system processes).

A mass storage system 716 (e.g. magnetic disk) can interface to the memory subsystem 702 to provide access to applications (or programs) stored thereon. For example, a user can initiate launch of an application (e.g. system services program, word processor, browser . . . ) that resides on the storage system 716. Once launched, the program is loaded into one or several parts the memory subsystem 702 for faster execution. Additionally, application and data activities are monitored for at least foreground and background activity.

As the user activates (or launches) the applications from the storage system 716, usage information is logged and processed in the monitor component 310 for model generation in the model component 316. Thereafter, the model component 316 can facilitate execution of one or more of the appropriate model(s) such that subsequent user interaction can lead to predicting a next application launch. Accordingly, based on the model(s) executed, the system 700 will begin prefetching the application(s) into the memory subsystem 702 and/or allocating memory space for processing of the application(s). Thus, the user and user system does not need to wait for such information to be loaded for execution or processing. It is to be understood that although this description speaks of "application" usage being monitored, this can also include code, data, and instructions associated with the application.

Prefetching can be performed in a manner that minimizes the perceived latencies associated with future application launches—given a constraint of the total memory available for prefetching (the knapsack). That is, a policy can be developed that maximizes the "expected value" of having a set of prefetched items (at any period in time, based on the current predictions) within a limited "knapsack" of a size equal to the memory available for prefetching.

Solving the knapsack problem ideally is NP-complete (non-deterministic polynomial time), a simple approximation can be used that is guaranteed to generate a result with a worst case of ½ the optimal total value—but it is often much, much better. That is, with this policy (described below), the worst-case is rare, and the method is good. This approximation to knapsack, is referred to herein as the "value-density" method. The idea is to sort items in a priority order, where the priority of each item is the cost-benefit ratio of value or gain associated with the item divided by cost of adding each item to memory. After computing these ratios, the ratios are lined up from the maximum cost-benefit ratio to the least until reaching the maximum memory of the total memory allocated to prefetching.

With the algorithm, one more step can be included to prove that the result will be of a high quality. Considering the single item with the largest single benefit that would fit into the knapsack, if it were there all alone, then compare the value of choosing only the item with the highest value and the value associated with the summation of the values of the list of applications, sorted by cost-benefit ratio (up to the memory deadline). By choosing the best of these two options, the resulting value of the knapsack solution, in one implementation, should be shown to be of a value within a factor of two of optimal.

Accordingly, the idea is to first compute a cost-benefit ratio for each potential item to prefetch. That is, compute a ratio of:

$$\frac{p(\text{launch}) * \text{utility (seconds saved if prefetched application is launched)}}{\text{megabytes of application}} \quad (1)$$

Rewriting this as:

$$\frac{p(\text{launch}) * \text{utility (SecSaved (megabytes of prefetched application))}}{\text{megabytes of application}}$$

Note that if megabytes scales linearly with perceived seconds saved, and the utility (that is, if Utility(SecSaved(megabytes)) is just SecSaved(megabytes), and this is a linear function (e.g., SecSaved=1/k*megabytes of prefetched application), then megabytes cancel out and the ratio for each potential prefetched application is just the probability. When this is the case, the applications can be sorted by probability and the memory continually added up until the memory constraint is reached.

However, if the utility is non-linear, the non-linear change in utility is computed as a function of megabytes, used in the numerator of Equation (1), and more user-centric prefetching performed.

Exploring the utility as a function of time, studies have been done in the past exploring the perception and/or influence different computer response times within different tasks, for example, data entry, web page downloads, etc. Based on this information, assertions can be made about the costs of different perceived delays. For example, in sets of applications delays may not be noticeable if they are less than some t seconds. The quantity of frustration with delays may not grow linearly with increasing delays, but may become noticeable at some threshold and then rise quickly, but then slow in rising.

With respect to a good utility function, it is desirable to convert megabytes into seconds of latency, and then convert seconds of latency into a notion of "badness" or perceptual cost, and the reduction in such latency that comes with prefetching as utility or "goodness." This suggests generating a function that approximately captures the way users feel when they have to wait for an application to launch. Utility functions can be considered that convert latencies into costs, and vice-versa, time savings with prefetching into benefits, or utility.

Consider a utility model that asserts that after latencies exceed a threshold set at one second, for example, the utility= (seconds saved)$^2$. (That is, the square of the seconds saved). This means that as the seconds of latency increase, the user frustration increases as the square of the seconds.

Other reasonable functions can be considered and tested with computer users for identifying the best parameterization of the functions. For example, squaring of time up to a point, after which a constant "badness" is reached; or perhaps a multi-linear function composed of two linear functions, where the slope changes after a wait time (e.g. two seconds) is reached.

Given some function that converts "latencies saved" from "seconds saved" into utility, the utility function can be inserted into the numerator in Equation (1), sort to get a value density, and continue prefetching until the bounded memory is full. As the probability changes, readjust the best list to fit, and determine if this causes a recommended change in the prefetched list.

Figure 8:
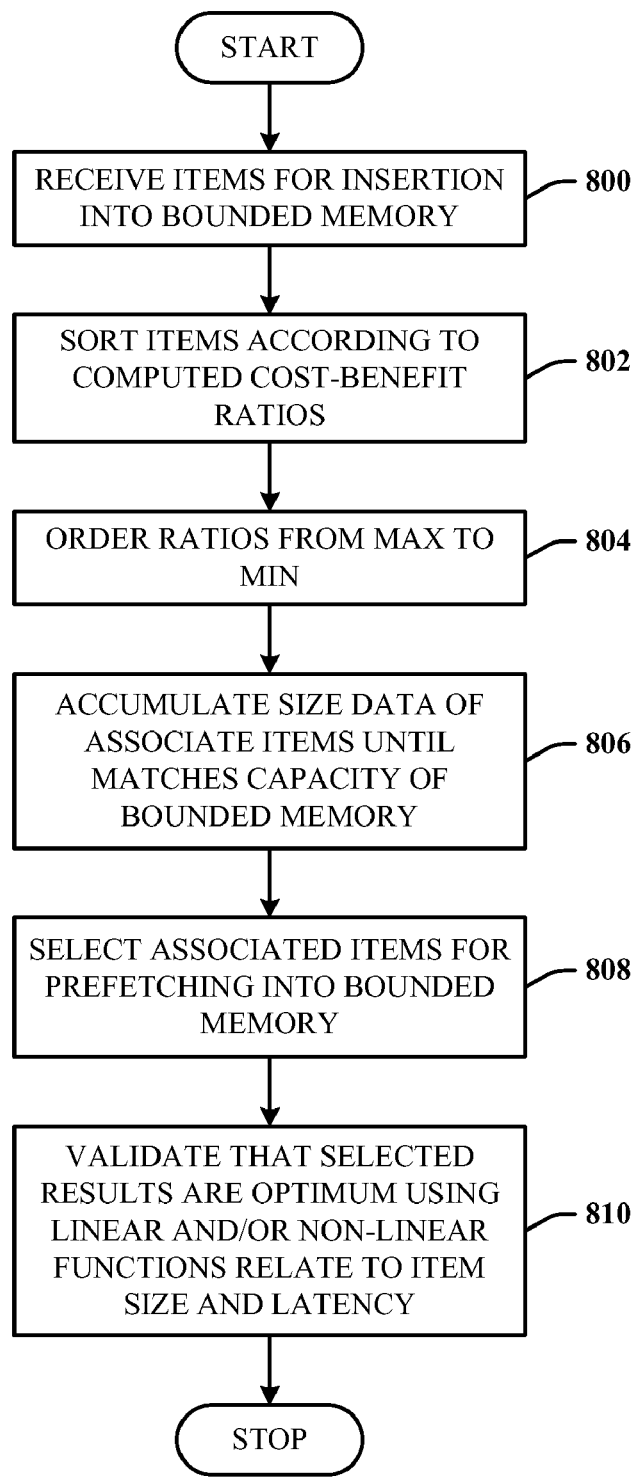
FIG. 8 illustrates a methodology of performing prefetching in a way that maximizes an expected value of having prefetched items within the bounded memory (or knapsack) to minimized perceived latencies.

FIG. 8 illustrates a methodology of performing prefetching in a way that maximizes an expected value of having prefetched items within the bounded memory (or knapsack) to minimized perceived latencies. At 800, items (e.g. data, applications) are received for consideration for insertion into the bounded memory. At 802, the items are sorted according to a cost-benefit ratio of priority data. Sorting can be based on learned and reasoning priority criteria such as related to the context information described herein, type of data, kind of data, data content (private or public), for example. Considering such criteria, the priority values are computed and assigned to the items according to the ratio described above. At 804, the ratios are ordered from the maximum to the minimum cost-benefit ratio. At 806, the sizes of the associated items (e.g., in megabytes) are accumulated (from the maximum ratio, down) until the total capacity of the bounded memory is reached. At 808, the items associated with the accumulated item sizes are selected for prefetching into the bounded memory. Optionally, at 810, validation can be performed to prove that the results are optimum by computing linear and/or non-linear functions related to item size and latency.

Figure 9:
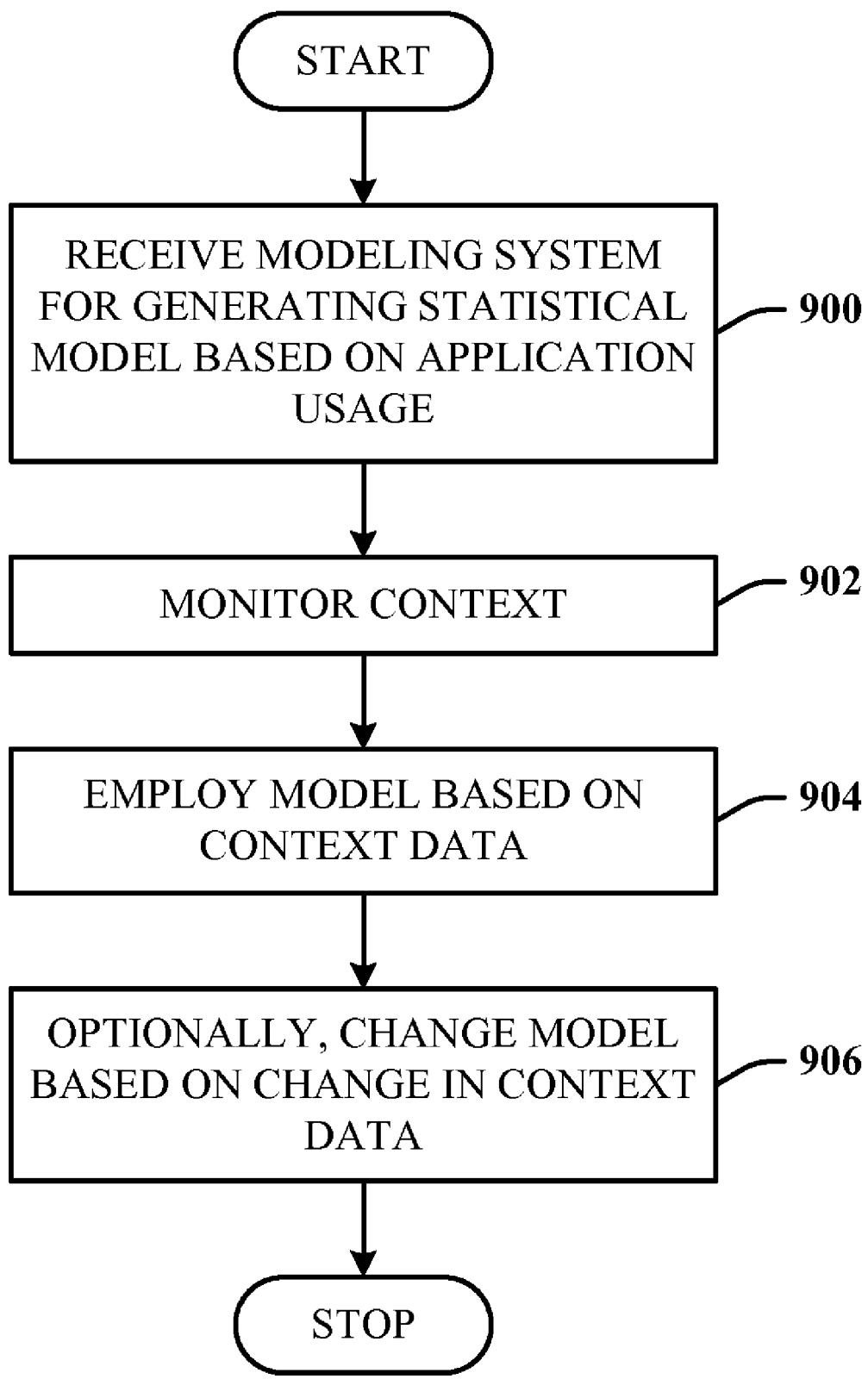
FIG. 9 illustrates a methodology of employing context information for model development and memory optimization in accordance with another aspect of the innovation.

FIG. 9 illustrates a methodology of employing context information for model development and memory optimization in accordance with another aspect of the innovation. At 900, a modeling system is received for generating one or more statistical models based on application usage. At 902, context is monitored for context data. At 904, a model is selected and employed based on the context data. At 906, optionally, the model can be changed (or updated) based on a change in context data.

Figure 10:
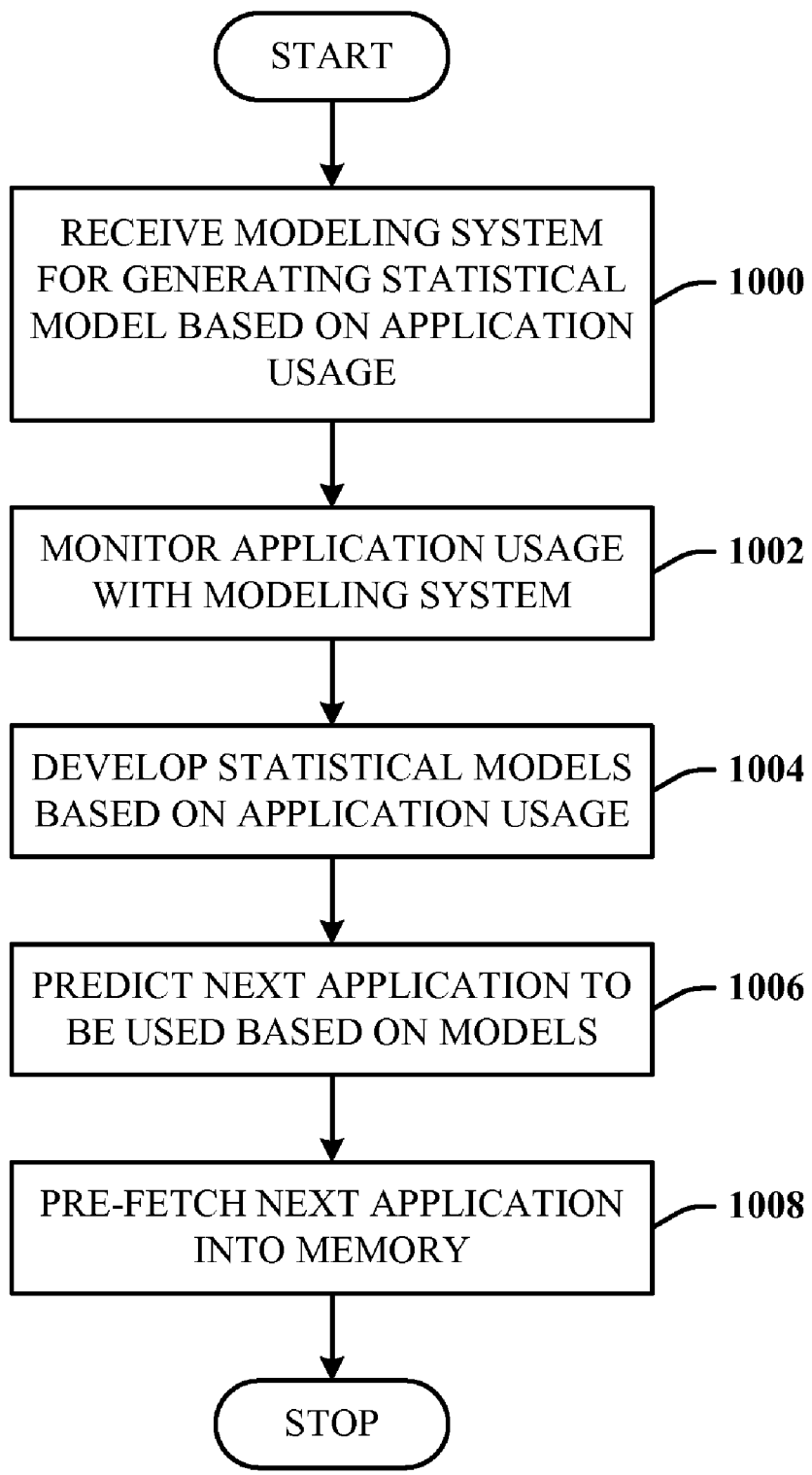
FIG. 10 illustrates a methodology of generating and a model and prefetching application information based on the model in view of memory optimization.

FIG. 10 illustrates a methodology of generating and a model and prefetching application information based on the model in view of memory optimization. At 1000, a modeling system is received for generating one or more statistical models based on application usage. At 1002, application usage is monitored. At 1004, one or more statistical models are generated based on the application usage. At 1006, prediction is made of the next application to be used based on one or more of the models. At 1008, a prefetch process is initiated in preparation for execution of the predicted application. It is to be appreciated that either one or both of the prefetch process or/and allocation process can be performed.

Figure 11:
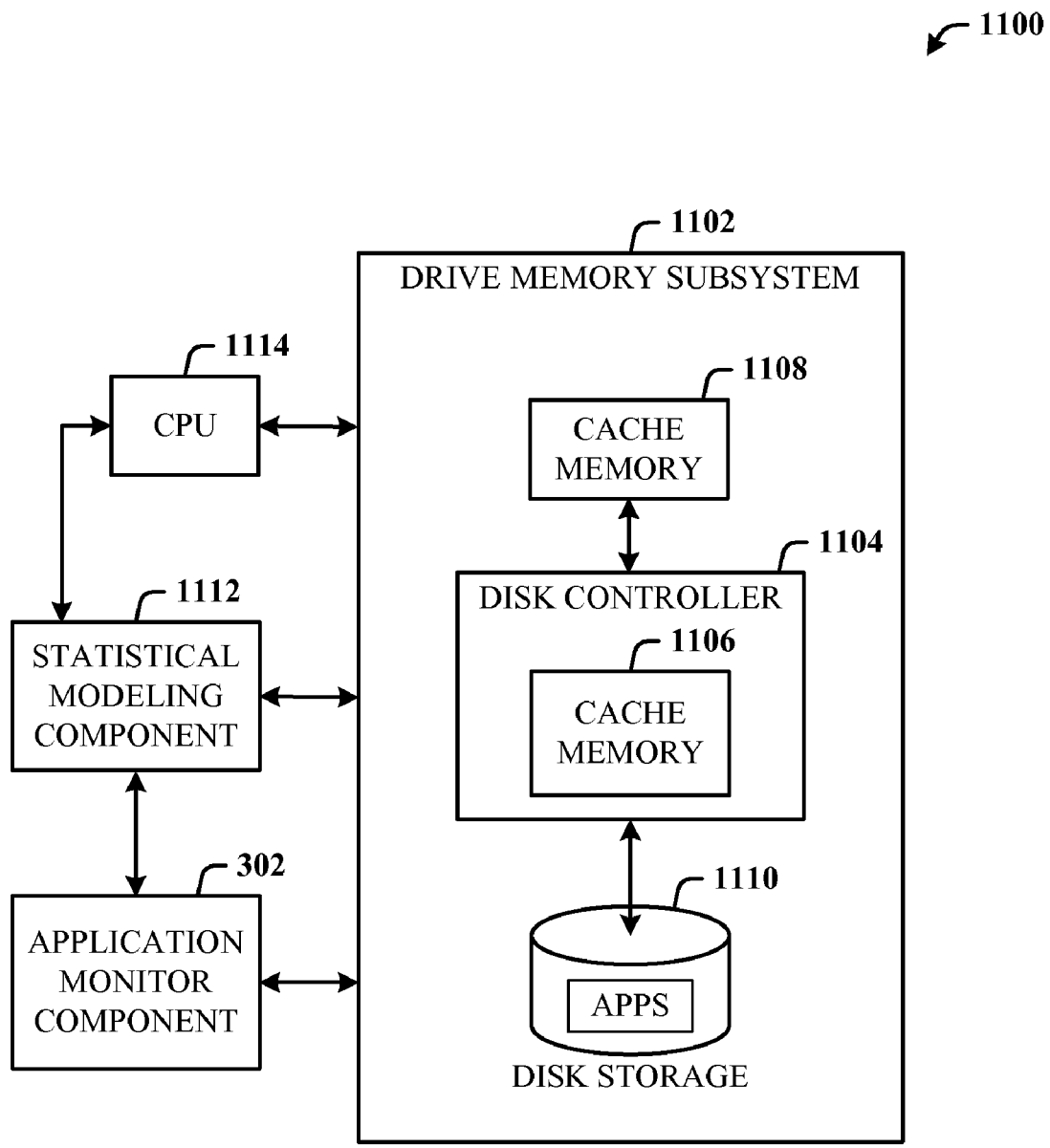
FIG. 11 illustrates a system having a drive memory subsystem that benefits from memory optimization and application transitioning in accordance with another aspect.

FIG. 11 illustrates a system 1100 having a drive memory subsystem 1102 that benefits from memory optimization and application transitioning in accordance with another aspect. Here, the optimization and application transitioning occurs at the drive level. The drive system 1102 can include a disk controller processor 1104 for controlling driver operations and for interfacing to other systems that utilize data stored on the drive subsystem 1102. The controller 1104 can have onboard controller cache memory 1106 for caching instructions, as well as interface to an external drive cache memory 1108 for caching data from a storage subsystem 1110 that the user has recently used. The storage subsystem 1110 (e.g., magnetic medium, optical disk) provides the mass storage capability for storing applications and data.

The application monitor component 310 can interface to the drive subsystem 1102 to monitor application usage, as the application is being pulled from the storage subsystem 1110.

At a higher level, application usage can be monitored through operating system (OS) calls, etc., by way of the OS and/or system CPU 1114. A statistical modeling component 1112 can then model the application activity, and apply the model for application transitioning through memory optimization in the cache memory (1106 and/or 1108) of the drive memory subsystem 1102.

Figure 12:
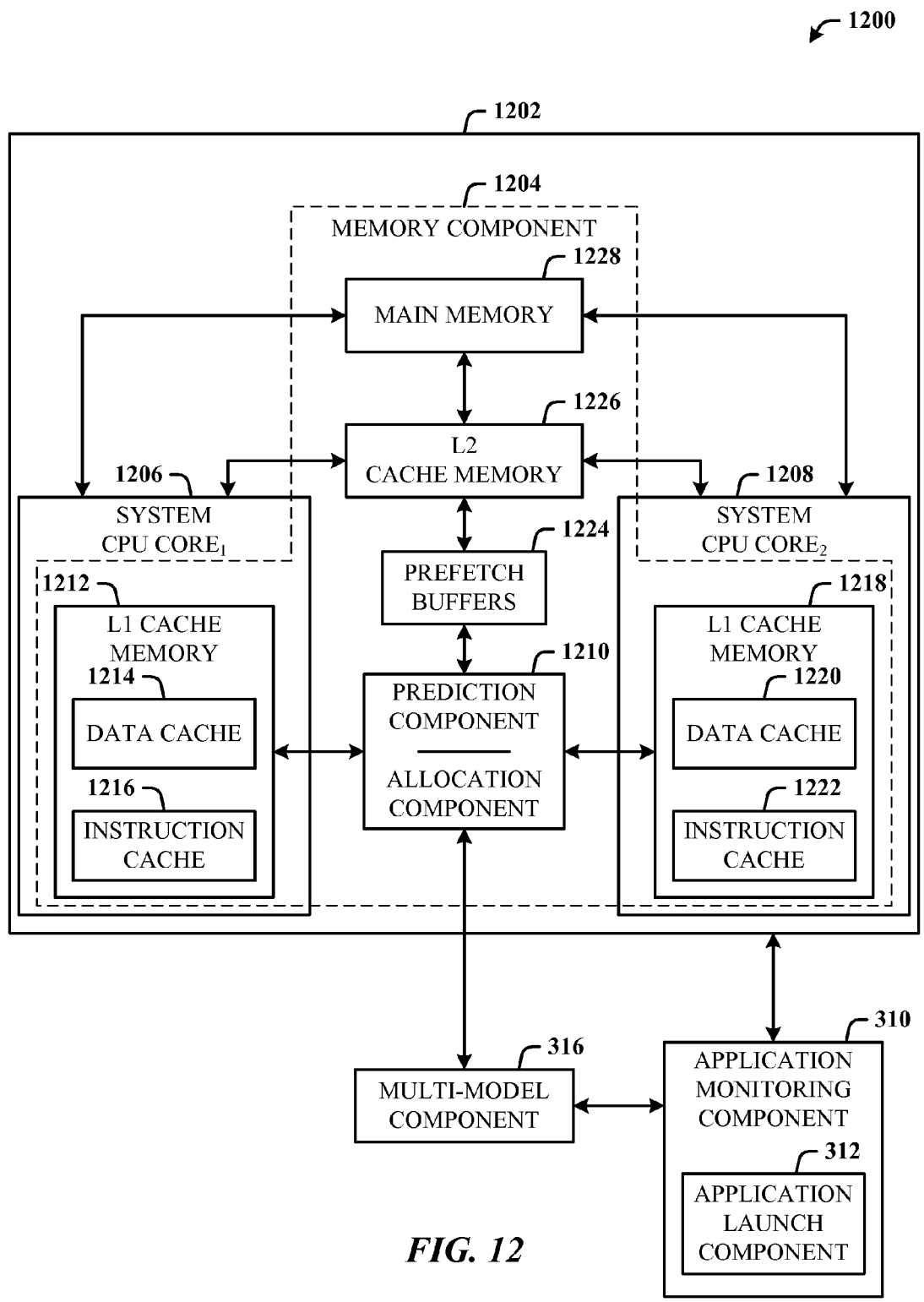
FIG. 12 illustrates a system having a dual core processor subsystem and accompanying memory component that benefits from bounded memory optimization and application transitioning in accordance with a novel aspect.

FIG. 12 illustrates a system 1200 having a dual core processor subsystem 1202 and accompanying memory component 1204 that benefits from bounded memory optimization and application transitioning in accordance with a novel aspect. The system 1200 includes a first system CPU core 1206 (denoted CPU $CORE_1$) and a second system CPU core 1208 (denoted CPU $CORE_2$) both of which can share in handling the overall processing capabilities of a system in which the subsystem 1202 is installed. Thus, the first core 1206 can process a first application and the second core 1208 can process a second application. Alternatively, both cores (1206 and 1208) can cooperate in processing aspects of a single application. In any case, the application monitoring component 302 that includes the application launch component 312 can interface to the core subsystem 1202 to monitor application usage as detected by an application being loaded for processing by either of the cores (1206 and 1208) or for two applications being loaded for respective processing by the cores (1206 and 1208).

The multi-model component 316 can interface to the core subsystem 1202 and the monitor component 310, thereby providing support for developing one or more models based on application usage and for model execution when requested. More specifically, the model component 316 can interface directly to a dual-purpose prediction and allocation component 1210, which provides both prediction processing and memory allocation for any connected memories. For example, the first core subsystem 1206 can include an L1 cache memory 1212 that further includes a data cache 1214 for caching frequently (or recently) used data, and an instruction cache 1216 for caching instructions that are frequently (or more recently) used. Similarly, the second core subsystem 1208 can include an L1 cache memory 1218 that further includes a data cache 1220 for caching frequently (or recently) used data, and an instruction cache 1222 for caching instructions that are frequently (or more recently) used.

The prediction and allocation component 1210 can interface directly to the L1 cache memories (1212 and 1218) for prefetch and/or allocation processing. A prefetch buffer 1224 is provided for buffering prefetch information during a prefetch process, which can be part of the prediction function. That is, once it has been predicted that an application will be utilized next by the user, the prefetch process can be initiated to begin pulling the application into memory for processing and launching. Along with this process, the allocation component 1210 can begin allocating memory space in the L1 caches (1212 and 1218), an L2 cache memory 1226 and/or a main system memory 1228, for example. In one implementation, the allocation process can occur through the prefetch buffers 1224 to the L2 memory 1226 and the main memory 1228. In an alternative implementation, the predication and allocation component 1210 interface directly to each of the L2 memory and the main memory 1228 to manage memory allocation, as needed.

It is within contemplation of the subject invention that a multi-processor system with associated cache memory can also benefit from the disclosed application transitioning and bounded memory optimization architecture.

Figure 13:
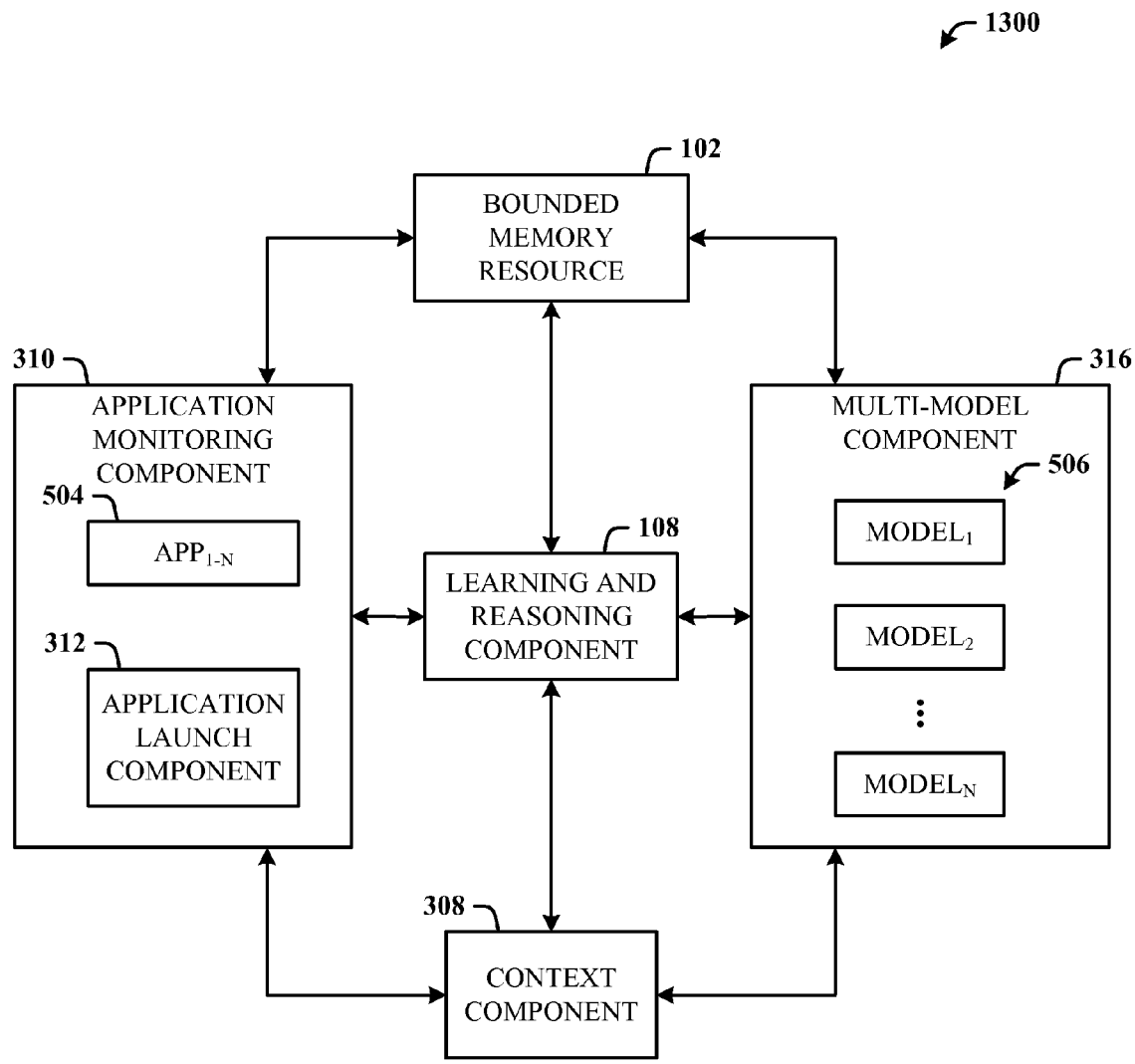
FIG. 13 illustrates an alternative implementation that utilizes the learning and reasoning component in a system for application transitioning an bounded memory optimization.

FIG. 13 illustrates an alternative implementation that utilizes the learning and reasoning component 108 in a system 1300 for application transitioning an bounded memory optimization. In one example, the component 108 can learn, based on context information (e.g., time of day, week, . . . ) of the context component 314 when the user typically launches an application 504. Consider that the user typically wakes up at 7:30 AM each day of the week, and launches an e-mail application to check on e-mail. Over time, the component 108 can learn this application usage information, and reason (or predict) that there is a high likelihood that the user will again launch and use this same e-mail application tomorrow. Accordingly, a statistical model 506 is generated with this information and for the purpose of, at about 7:30 AM tomorrow, launching the application for the user via the application launch component 312. Additionally, the component 108 can be utilized to predict the next application to be launched after the initial application launch.

In preparation for doing so, the architecture can further manage at least memory prefetch and/or allocation functions at the system level, and even at the drive level, to automate and quickly bring to presentation to the user the predicted e-mail application. Over time, the model may need to be updated based on changes in user interaction with the e-mail application.

In another example of a mobile device or portable computing device, based on geolocation context information (e.g., global positioning system) and application usage information, the architecture can learn and reason that the user typically launches a device browser application at this location. Accordingly, a statistical model will be developed such that when the user approaches this location the next time, the model execution will cause automatic launching or imminent launch preparation of the device browser application. Thus, memory management processes (e.g., prefetching and allocation) can be initiated in preparation and for launching of the browser application.

Figure 14:
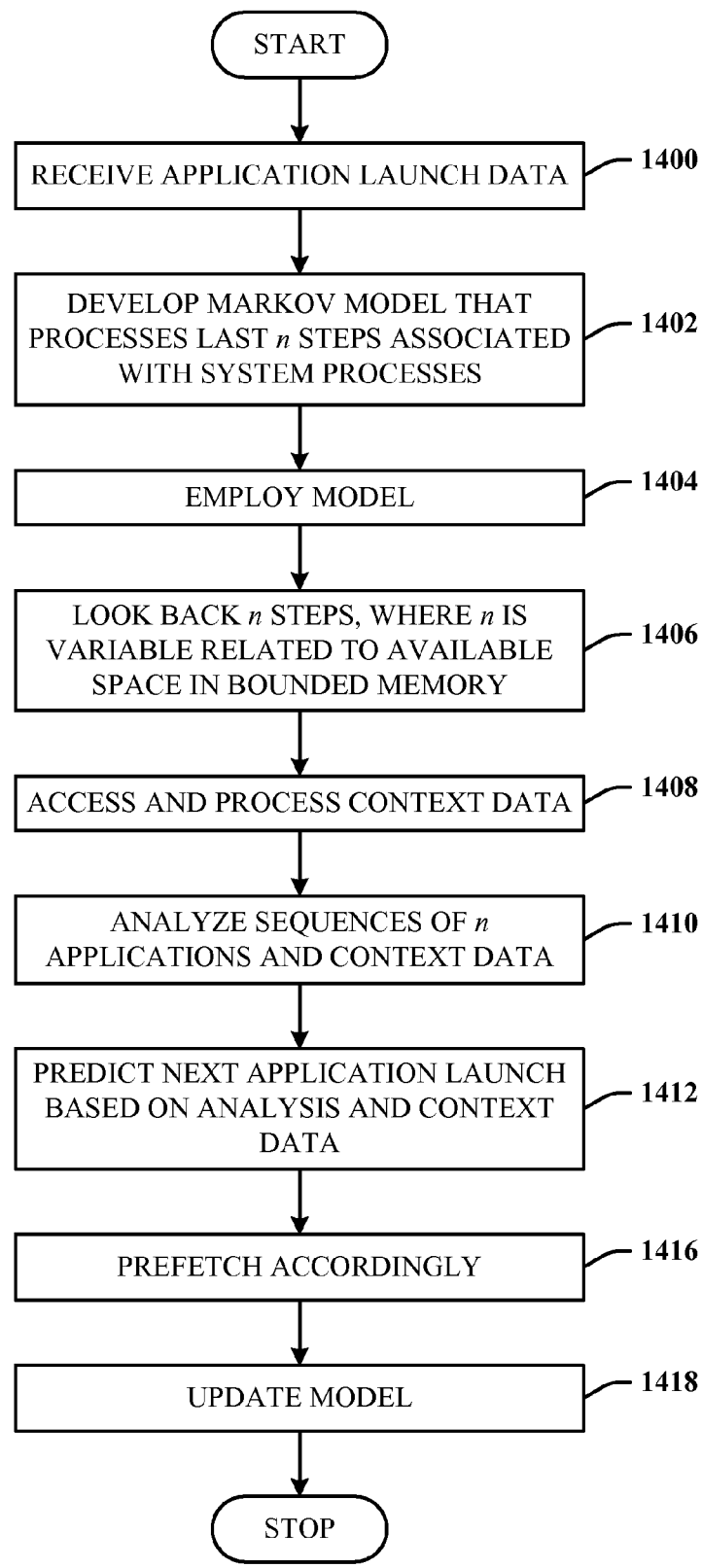
FIG. 14 illustrates a methodology of inferring probability of a next application launch based on observed processes using a Markov model.

As indicated above, one a probabilistic model that can be used to infer the probability of the next application launch, based on a sequence of observed applications, is a Markov model. Accordingly, FIG. 14 illustrates a methodology of inferring probability of a next application launch based on observed processes using a Markov model. At 1400, application launch data from previous process activity is received. At 1402, a Markov model is developed that predicts a next application launch based on previous steps associated with system processes. At 1404, the model is employed in the system. At 1406, the model looks back n-steps associated with the system processes, where n is a number that can be varied depending on the available memory.

At 1408, context data is accessed and processed as part of the model. The model continues to look at the top n of all applications being used by a user, and in combination with contextual information such as time of day and day of week, for example, builds Markov models that are focused on explicitly reasoning about the top n applications. At 1410, using both the n applications and an "other" (O) application tokens (O meaning "other", representing processes that have not been modeled explicitly), the model examines sequences, for predicting the next applications, as indicated at 1412. In other words, under bounded resources, the methods consider that they just saw used and/or launched, App 1, App3, App4, O, and App5, and the methods predict that the likelihood of the next application used, in order of probability is, App5, App8, O, App7, and so on. This is one way of dealing with the bounded resources issues. At 1416, the predicted application and/or data are prefetched. At 1418, the model can be updated based on changes in activities or other information (e.g., context changes).

The predictive models can be employed for predicting the next launched application, that is, the next application to be launched that has not been launched before within a session or extended session, or the next application to be used, that is, to be switched to in a multitasking environment.

Evidence that applications have been already launched by the user within a session versus not yet launched, or launched and then closed, can be used in such a predictive model. For example, in learning and using a model for predicting the next application to be used or launched the model can segment out and have different naming for applications that are already launched versus applications that have not yet been launched. The sequences for Markov modeling can also include applications that have been closed.

With increasing memory allocations and observational data, richer models can be employed that consider other evidence. For example, the amount of time that a user has been at his or her computer after a log-in to that computer in addition to the application launching and usage may be useful in making predictions. The amount of time that a user has been away from the computer when the user returns may be useful. The amount of time that a user has been active within each application may also be useful in making predictions. In addition, the tasks or subtasks performed within applications (e.g., reading sets of new email messages, performing a save operation, . . . ) may be useful in making predictions of application switching and usage.

Prediction can be related not only to the next application to be launched, but also within what timeframe. For example, it can be predicted that App1 will launched within the next five applications and/or within the next ten minutes.

As indicated above, one implementation of the subject architecture can employ a "model mixture" method, where a Markov model, for example, can be combined with a model that captures background statistics.

Figure 15:
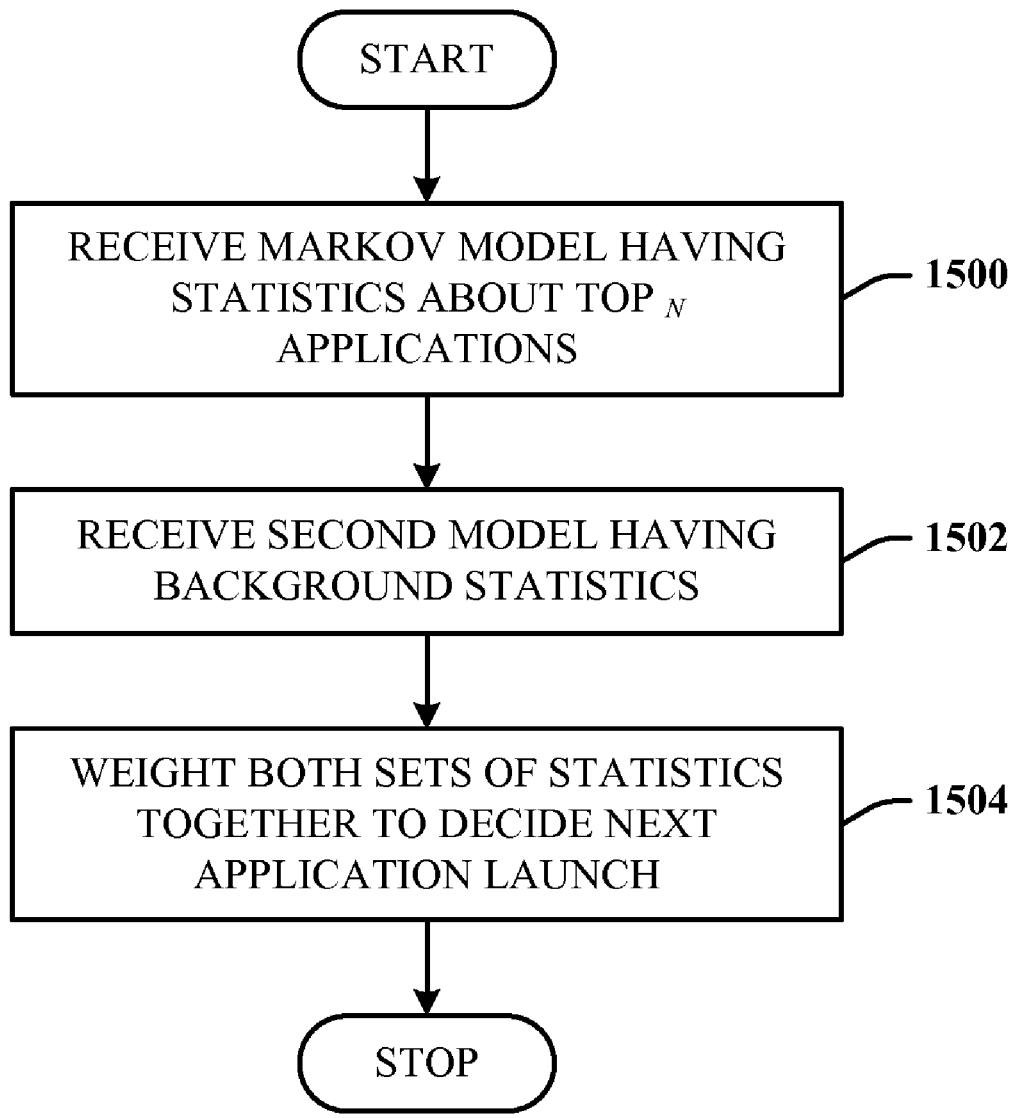
FIG. 15 illustrates a methodology of mixing models to achieve the desired application transitioning and bounded memory management.

FIG. 15 illustrates a methodology of mixing models to achieve the desired application transitioning and bounded memory management. At 1500, receive Markov model that provides statistics about the top n applications to decide a next application launch. At 1502, receive model that capture background statistics. At 1504, these statistics can then be weighted together, based on decisions about which statistics more reliability should be placed. The statistics can be weighted together with weightings of k and 1−k, where k can be varied or tuned. For example, consider that the Markov model predicts that the likelihood that App1 will be the next application launched (or correspondingly in another representation that the likelihood that application App1 will be launched within the next five applications, and/or within ten minutes, etc., is a value 0.2, but background statistics alone indicate that App1 will be launched according to a value of 0.4. With model mixture, the likelihood can be computed to be $(1-k)(0.2)+(k)(0.4)=p$. This can still be considered to be a probability, if $k \leqq 1$.

Figure 16:
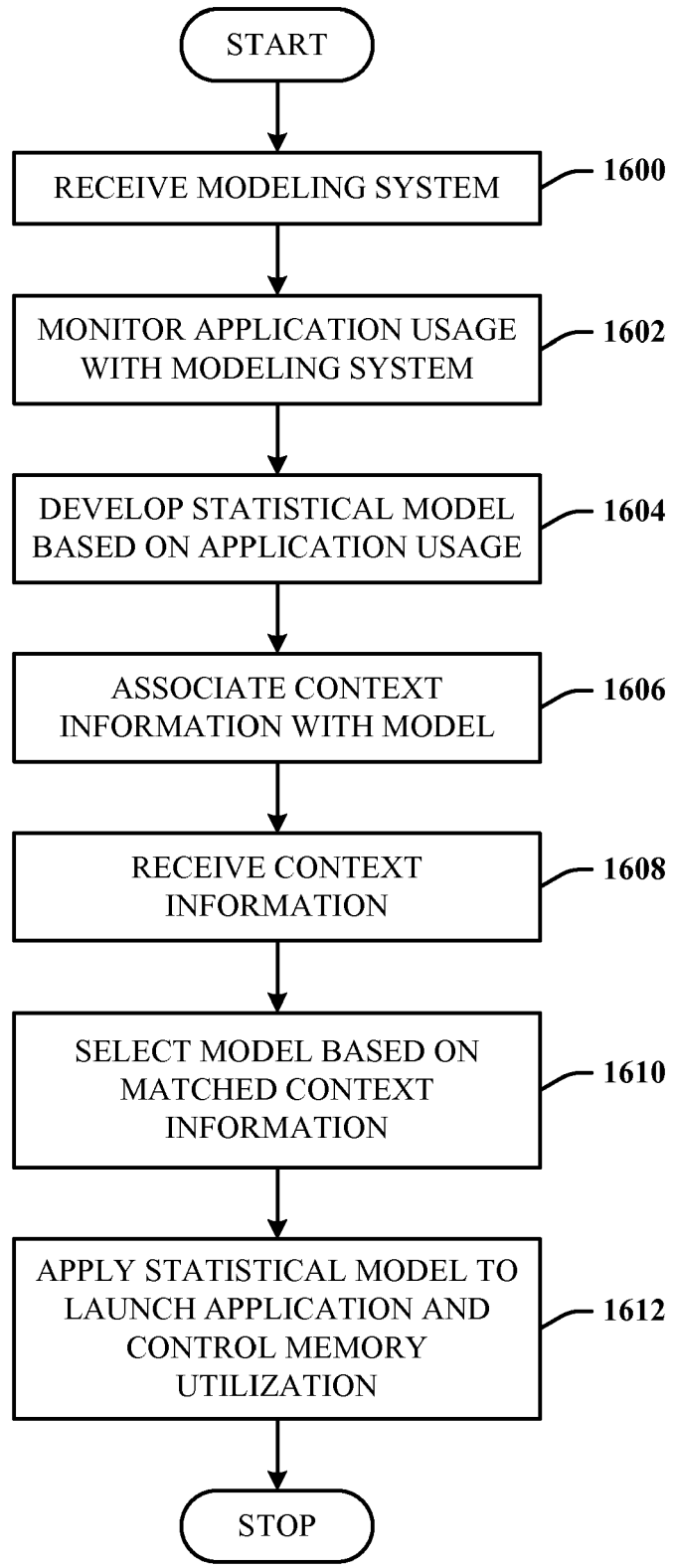
FIG. 16 illustrates a flow diagram of a methodology of selecting a statistical model for execution in accordance with an aspect.

FIG. 16 illustrates a flow diagram of a methodology of selecting a statistical model for execution in accordance with an aspect. At 1600, a statistical modeling system is received. At 1602, application usage is monitored and usage information is shared with the modeling system. At 1604, a model is developed based on the usage. At 1606, context information related to the application usage is associated with the model. At 1608, thereafter, when context information is received, the model is selected based on the matched (or substantially matched) context information, as indicated at 1610. At 1612, the model is applied (or executed) to launch the associated application, and manage memory utilization, as described herein. This methodology associates the context information separate from the model development. However, in an alternative implementation, it is to be appreciated that the context information can be included as part of the model.

Figure 17:
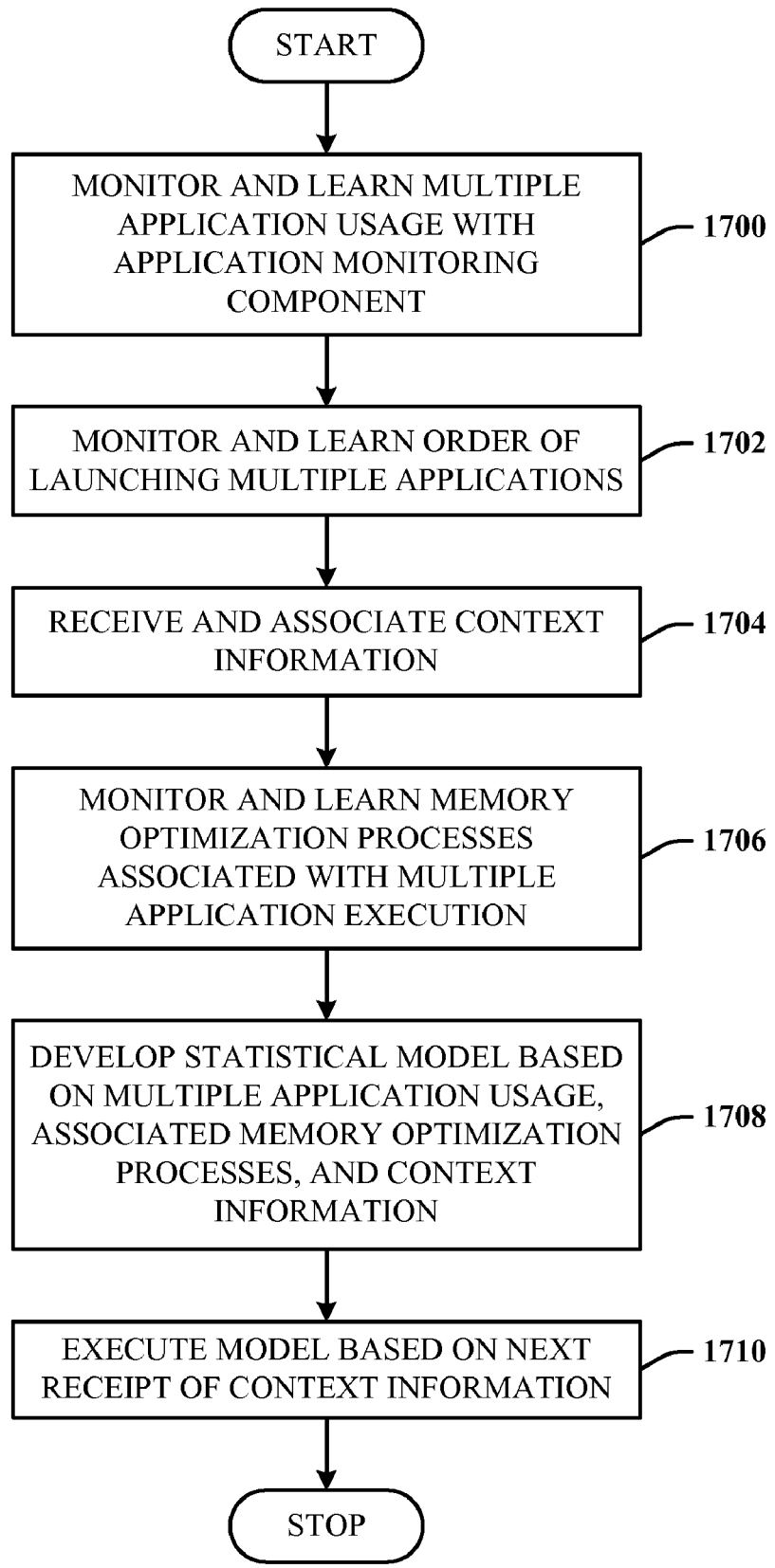
FIG. 17 illustrates a methodology of learning and reasoning about multiple application transitioning and memory optimization processes.

FIG. 17 illustrates a methodology of learning and reasoning about multiple application transitioning and memory optimization processes. At 1700, multiple applications usage is monitored. At 1702, the order of launching the multiple applications is stored. At 1704, context information is received and associated with the multiple applications usage information. For example, the context information can be the location of the user (e.g., office or home), the time of day (e.g., morning at home, afternoon at work, or evening at home again), the type of computing device employed (e.g., a portable computer or a cell phone), the size of the cache memory in the device, the available applications (e.g. a cell phone could have fewer and less memory/CPU intensive applications than a portable computer), and so on. Many other context parameters or attributes can be included in the context information for consideration.

At 1706, memory optimization processes associated with the multiple applications can also be monitored. For example, if it is learned and reasoned that the order of launching of the multiple applications should be changed to optimize memory processes, then the system can change the order, insofar as the user allows this to occur. For example, if the change in order occurs transparently to the user, no user intervention should be required. However, if the order change is noticeable to the user such that the user desires to maintain the previous order of application launch, the user can override or change the order back to the original order, which override process can be learned by the system, and reasoned for avoidance the next time.

At 1708, a statistical model is developed that considers the context information, the multiple applications usage information, and memory optimization information. At 1710, the model is executed based on the next receipt of the context information. The system can reason about the amount of context information received in order to determine if this model and its associated context information is a sufficient match for execution of this model, or a different model should be executed.

It is to be appreciated that the models generated can be moved (or copied) from one system to another to avoid "re-modeling" of other user systems. This is most advantageous where the computing systems are substantially similar in hardware and software capabilities, as well as applications. For example, model sharing can be accomplished more seamlessly between two desktop computers running substantially the same applications, than between a desktop computing system and a cellular telephone, for example.

Figure 18:
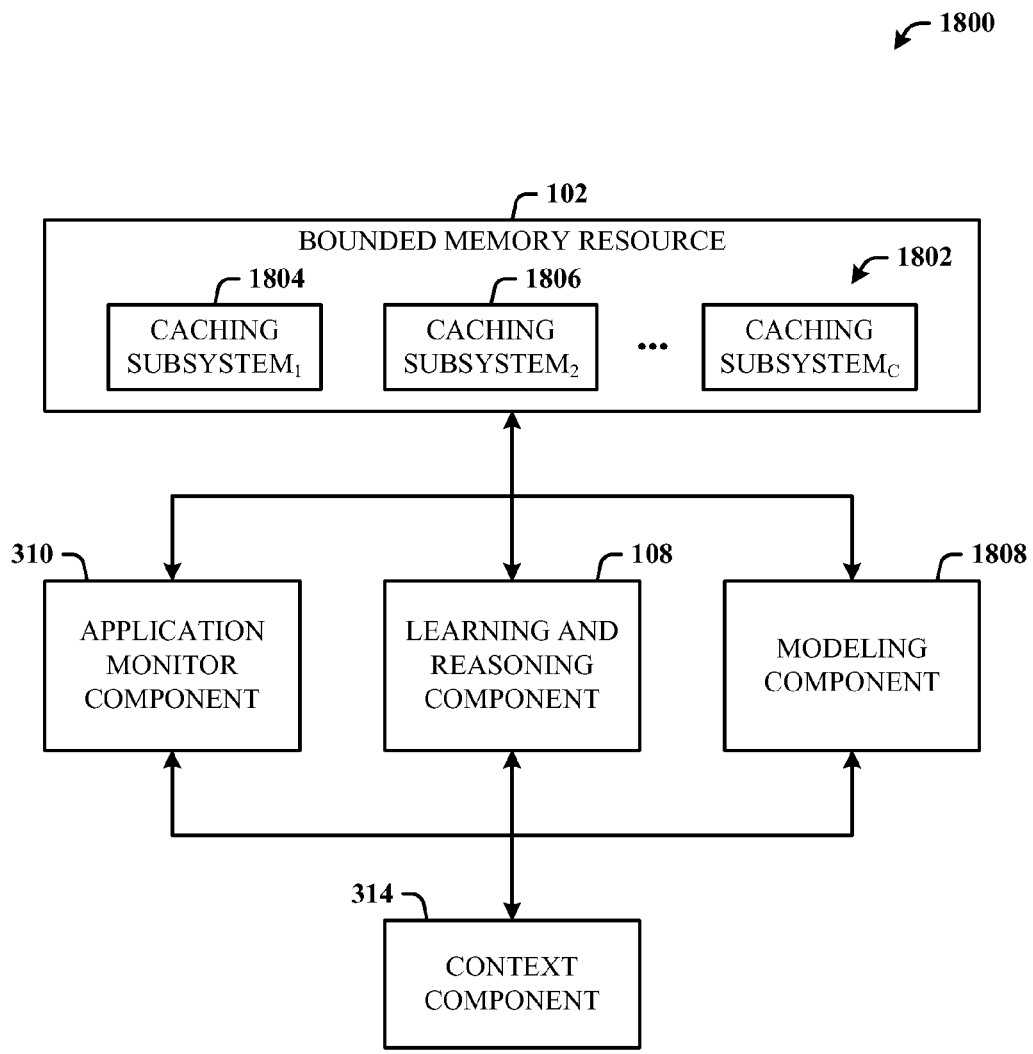
FIG. 18 illustrates a system for managing multiple caching subsystems of the bounded memory resource for application transitioning and memory utilization.

FIG. 18 illustrates a system 1800 for managing multiple caching subsystems 1802 of the bounded memory resource 102 for application transitioning and memory utilization. It is to be appreciated that many computing systems and/or networks employ many different caching subsystems 1802 (denoted CACHING SUBSYSTEM$_1$, CACHING SUBSYSTEM$_1$, ..., CACHING SUBSYSTEM$_C$, where C is an integer). For example, as indicated supra, a first caching subsystem 1804 is employed at the mass storage level (e.g., hard drive), a second caching system 1806 is employed at the system board level (e.g., the processor internal and external cache), a third caching subsystem can be employed at a network server for multi-user applications access and processing, and yet a fourth subsystem on a local graphics adapter for enhanced performance of graphics processing.

Accordingly, the disclosed architecture can be employed to consider more complex combinations of caching and applications processing. For example, applications transitioning and memory optimization processing can be focused more toward system processes and programs (e.g., startup, handshaking of graphics and CPU processes, OS processes) rather than (or in combination with) the applications and programs that the user would normally see or desire to have launched, such as a browser, a word processing application, an e-mail program, and a graphics development environment application.

In support thereof, the system 1800 includes a modeling component 1808 (e.g., Markov model, mixed model . . . ) for generating models for execution, the application monitoring component 310 for monitoring application and program usage at all levels of system activity, the context component 314 for receiving and processing context information in association with the usage being logged and processed, and optionally, the learning and reasoning component 108 for learning and reasoning about system application and program usage and memory optimizations, and thereafter facilitating automation of one or more of such activities.

In one example, launching of an application can be coordinated between the caching subsystem 1804 at the mass storage drive level with the caching subsystem 1806 (e.g., CPU, L1 cache, L2 cache, . . . ) at the system board level to provide improved application loading.

In another example, the caching subsystem at the network server can be accessed for improved network application activity between the user client and the server.

In yet another example, memory caching optimization and application transitioning can be coordinated between a portable device (e.g., PDA, cell phone, . . . that can communicate (e.g. in a wired fashion via USB or wirelessly) with a desktop computer. Over time, as the user repeatedly couples these two systems, the model component 1808 can model application and memory activities for predicting and employing future application and memory optimizations. As before, the component 108 can apply learning and reasoning to further improve on user habits and behaviors, as well as system behaviors.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 19:
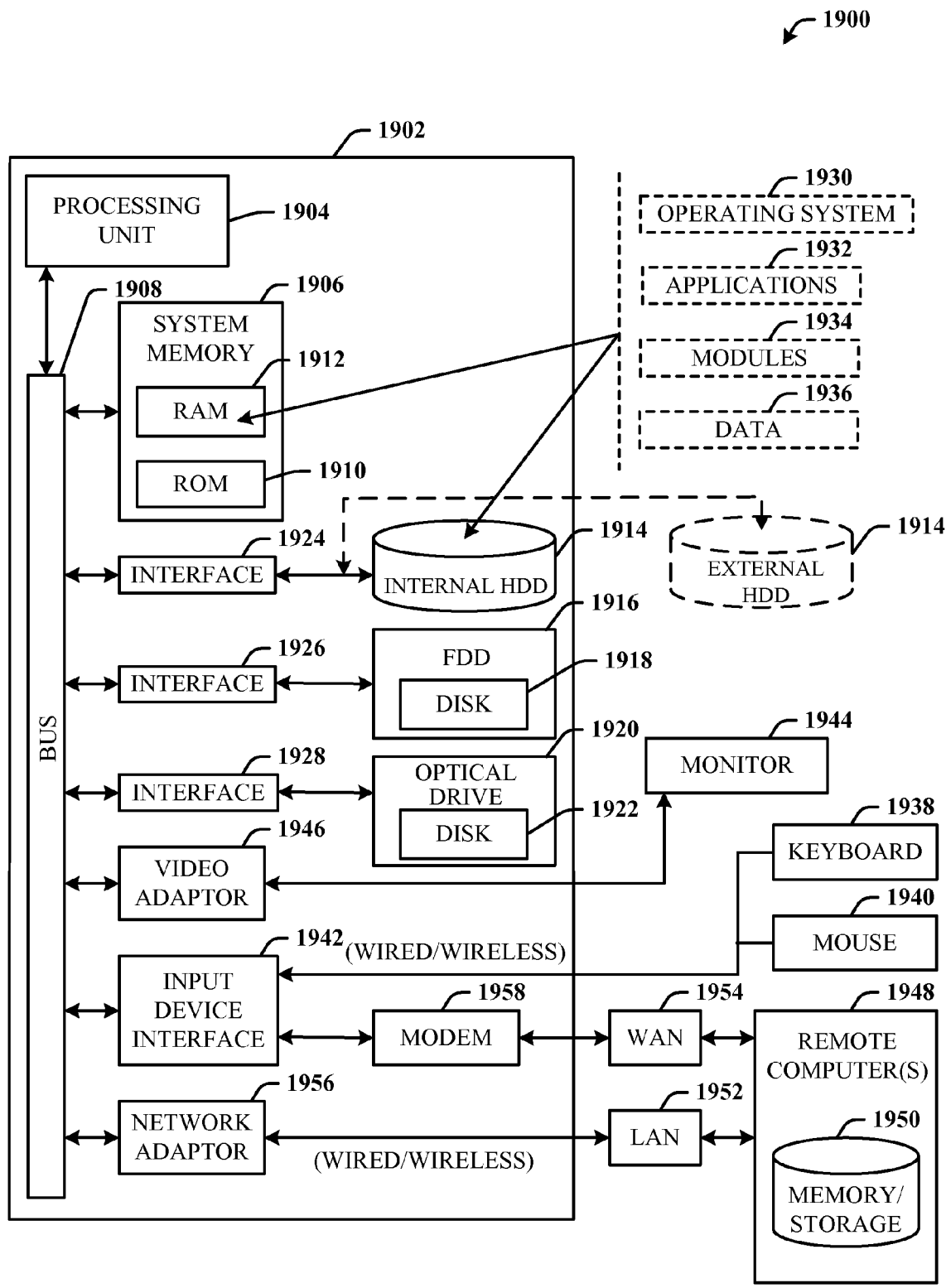
FIG. 19 illustrates a block diagram of a computer operable to execute the disclosed application transitioning and memory optimization architecture.

Referring now to FIG. 19, there is illustrated a block diagram of a computer operable to execute the disclosed application transitioning and memory optimization architecture. In order to provide additional context for various aspects thereof, FIG. 19 and the following discussion are intended to provide a brief, general description of a suitable computing environment 1900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 19, the exemplary environment 1900 for implementing various aspects includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures may also be employed as the processing unit 1904.

The system bus 1908 can be any of several types of bus structure that may further interconnect to a memory bus (with or without a memory controller), a peripheral bus, and a local bus using any of a variety of commercially available bus architectures. The system memory 1906 includes read-only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914 (e.g., EIDE, SATA), which internal hard disk drive 1914 may also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. It is to be appreciated that the innovation can be implemented with various commercially available operating systems or combinations of operating systems.

A user can enter commands and information into the computer 1902 through one or more wired/wireless input devices, e.g. a keyboard 1938 and a pointing device, such as a mouse 1940. Other input devices (not shown) may include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 1394 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers, etc.

The computer 1902 may operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which may connect to a global communications network, e.g., the Internet.

When used in a LAN networking environment, the computer 1902 is connected to the local network 1952 through a wired and/or wireless communication network interface or adapter 1956. The adaptor 1956 may facilitate wired or wireless communication to the LAN 1952, which may also include a wireless access point disposed thereon for communicating with the wireless adaptor 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g. a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 20:
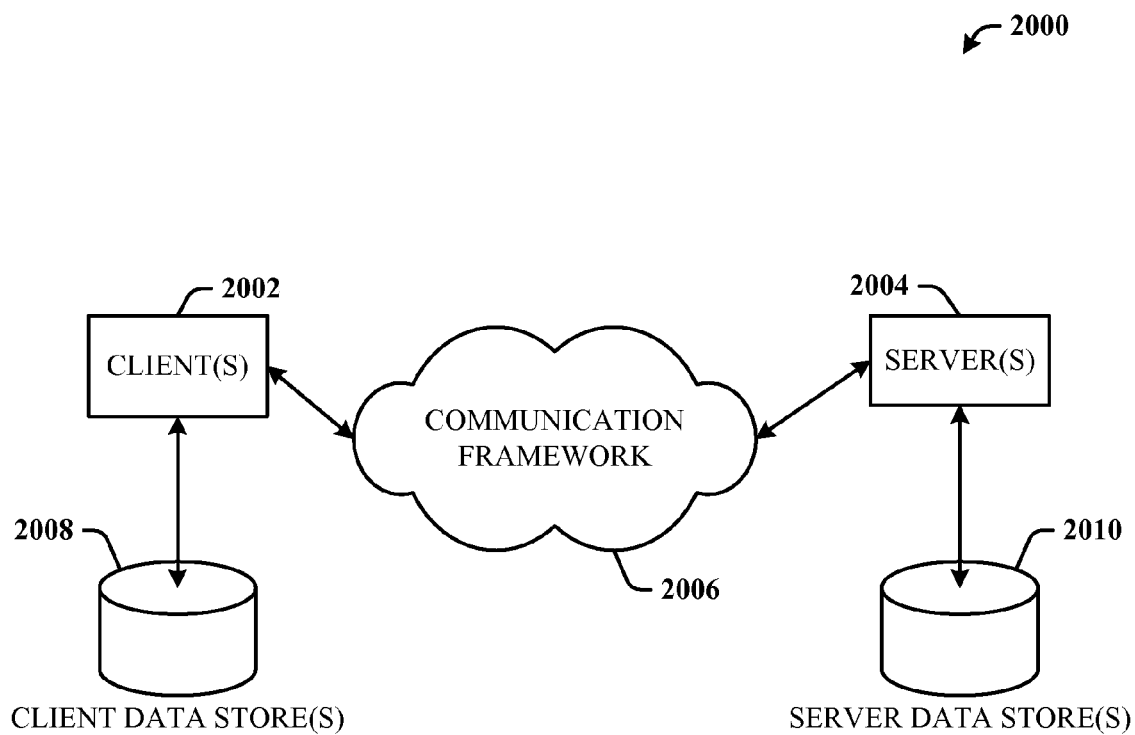
FIG. 20 illustrates a schematic block diagram of an exemplary application transitioning and memory optimization computing environment in accordance with another aspect.

Referring now to FIG. 20, there is illustrated a schematic block diagram of an exemplary application transitioning and memory optimization computing environment 2000 in accordance with another aspect. The system 2000 includes one or more client(s) 2002. The client(s) 2002 can be hardware and/or software (e.g., threads, processes, computing devices). The client(s) 2002 can house cookie(s) and/or associated contextual information by employing the subject innovation, for example.

The system 2000 also includes one or more server(s) 2004. The server(s) 2004 can also be hardware and/or software (e.g., threads, processes, computing devices). The servers 2004 can house threads to perform transformations by employing the invention, for example. One possible communication between a client 2002 and a server 2004 can be in the form of a data packet adapted to be transmitted between two or more computer processes. The data packet may include a cookie and/or associated contextual information, for example. The system 2000 includes a communication framework 2006 (e.g., a global communication network such as the Internet) that can be employed to facilitate communications between the client(s) 2002 and the server(s) 2004.

Communications can be facilitated via a wired (including optical fiber) and/or wireless technology. The client(s) 2002 are operatively connected to one or more client data store(s) 2008 that can be employed to store information local to the client(s) 2002 (e.g., cookie(s) and/or associated contextual information). Similarly, the server(s) 2004 are operatively connected to one or more server data store(s) 2010 that can be employed to store information local to the servers 2004.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory component for utilization by system processes;
   a learning and reasoning component, implemented by one or more processors configured with executable instructions, to provide a model that predicts a next launch of a system process and to provide a cost-benefit analysis of pre-fetching data into the memory component and for retaining data already in the memory component, with the cost-benefit analysis based in part on a first rate at which cost is calculated before a threshold time, and a second rate at which cost is calculated after the threshold time, the first rate being less than the second rate; and
   a management component that manages the memory component to reduce latency according to input from the learning and reasoning component, the input including:
   system processes sorted in a priority order, the priority order based on a benefit of a system process divided by a cost of adding that system process to the memory component; and
   a single system process, having a benefit greater than all other system processes and sized to fit into the memory component if it were alone in the memory component;
   the management component configured to select between a cost-benefit value of the single system process and a portion of the system processes sorted in the priority order, the portion including system processes having highest cost-benefit values and limited to as many system processes as will fit into the memory component.

2. The system of claim 1, wherein the management component manages a decision-theoretic model to reduce the latency associated with the system process according to cost-benefit and uncertainty.

3. The system of claim 1, further comprising an application launch component for monitoring data of the system process to predict launch and/or usage of a next application.

4. The system of claim 3, wherein the data monitored by the application launch component is associated with foreground launch activity of the system process.

5. The system of claim 3, wherein the application launch component distinguishes between a foreground launch and a background launch of the system process, which is an application.

6. The system of claim 1, further comprising an application launch component that monitors launch data associated with an application, stores a record of the launch data, generates a transition model based on the launch record, and updates the model based on new launch data.

7. The system of claim 1, further comprising an application launch component that utilizes a Markov model for computing probability data associated with inferring when a next system process will be launched.

8. The system of claim 1, further comprising a prefetch component that prefetches data into the memory component based on a decision data of a probabilistic and/or decision-theoretic model.

9. The system of claim 1, further comprising a retention component that maintains data in the memory component based on decision data of a probabilistic and/or decision-theoretic model.

10. A computer-implemented method of managing system resources, comprising:
    receiving access to a memory component of a device for utilization by device processes;
    processing a model, the model predicting execution of the device processes;
    performing, by one or more processors configured with executable instructions, a cost-benefit analysis of the device processes, with a cost in the cost-benefit analysis based in part on latency, the cost-benefit analysis using a latency period to calculate a cost, the cost-benefit analysis changing after a threshold period of time such that the cost-benefit analysis assigns a lesser cost to units of time before the threshold period and a greater cost to same duration units of time after the threshold period;
    sorting the device processes into a priority order based on the cost-benefit analysis;
    identifying a single device process having a benefit greater than all other device processes and sized to fit into the memory component if it were alone in the memory component;
    selecting between a cost-benefit value of the single device process and a portion of the device processes sorted in the priority order, the portion including device processes having highest cost-benefit values and limited to as many device processes as will fit into the memory component; and
    using the selection between the single device process and the portion of the device processes to make decisions to pre-fetch and retain data in the memory component to reduce latency associated with the device processes.

11. The method of claim 10, further comprising:
    separating the device processes related to applications into a group of applications the user cares about and a group of applications the user does not care about using a classification mechanism based on usage monitoring; and
    predicting when a next application will launch as part of the device processes based on the groups.

12. The method of claim 11, further comprising inferring probability data associated with determining when the next application will launch, using a Markov model.

13. The method of claim 10, wherein processing the model includes computing an optimization based on user perceptions of the latency.

14. The method of claim 13, wherein the optimization is based on a value-density approximation to a knapsack representation associated with minimizing actual and/or perceived latencies.

15. The method of claim 10, further comprising optimizing a prefetch process to minimize user perception of latency associated with one of the device processes.

16. The method of claim 10, further comprising predicting when an application will launch based on contextual information and at least one of the device processes.

17. The method of claim 10, further comprising performing a prefetch operation based on the cost-benefit analysis.

18. The method of claim 10, further comprising employing a second model in combination with the model to make a decision related to prefetching data into the memory component.

19. A computer-implemented method of managing resources, comprising:
    under control of one or more processors configured with executable instructions,
    determining available memory in a computer for processing programs and data;
    developing and processing models for predicting an application launch, the models including a Markov model that processes a last n steps associated with system processes;
    looking back n steps, where n is a variable related to the available device memory and is greater than zero;
    accessing and processing context data;
    analyzing sequences of n applications and context data using the models, the context data including an amount of time a user has been logged into the computer, an amount of time a returning user has been away from the computer and an amount of time a user has been active within each of the n applications;
    predicting a next application launch based in part on analysis and context data, the predicting managing processing of the programs and data based on the available memory to reduce latency associated with the programs and data;
    sorting resources into a priority order based on the cost-benefit analysis;
    identifying a resource having benefit greater than all other resources and sized to fit into the available memory if it were alone in the available memory;
    selecting between a cost-benefit value of the single resource and a portion of the resources sorted in the priority order, the portion including resources having highest cost-benefit values and limited to as many resources as will fit into the memory component;
    pre-fetching resources according to the prediction of the next application launch and the selection between the cost-benefit value of the largest resource and the sum of the cost-benefit values of the portion of the resources; and
    updating the models for predicting application and data actions.

* * * * *